United States Patent [19]

Johnson

[11] Patent Number: 4,722,621

[45] Date of Patent: Feb. 2, 1988

[54] KEYBOARD ASSEMBLY AND RECORDING APPARATUS

[76] Inventor: Reynold B. Johnson, 548 E. Crescent Dr., Palo Alto, Calif. 94301

[21] Appl. No.: 793,062

[22] Filed: Oct. 30, 1985

[51] Int. Cl.⁴ .............................................. B41J 5/00
[52] U.S. Cl. ..................................... 400/110; 400/86; 400/144.2; 400/149; 400/171; 400/174; 400/472; 400/479.2; 400/484; 400/657; 400/659; 400/662; 400/716; 340/365 L
[58] Field of Search ................. 400/86, 109, 110, 111, 400/144.2, 144.3, 149, 150, 165.1, 171, 172, 173, 174, 175, 479, 479.2, 484, 554, 656, 657, 659, 662, 704, 716, 472, 473, 474, 477, 479.1; 340/365 R, 365 L

[56] References Cited

U.S. PATENT DOCUMENTS

| | | | |
|---|---|---|---|
| 599,397 | 2/1889 | Marshman et al. | 400/165.1 X |
| 837,279 | 12/1906 | Bradford | 400/662 X |
| 3,264,757 | 8/1966 | Kobler | 400/86 X |
| 3,584,162 | 6/1971 | Krakinowski | 400/479 X |
| 3,820,644 | 6/1974 | Yeh | 400/110 |
| 3,833,106 | 9/1974 | Khalil | 400/704 |
| 3,868,681 | 2/1975 | Ohyama et al. | 400/479 X |
| 4,026,403 | 5/1977 | Inose et al. | 400/144.2 X |
| 4,051,606 | 10/1977 | Tozo | 400/86 X |
| 4,064,983 | 12/1977 | Inose et al. | 400/110 |
| 4,106,611 | 8/1978 | Suzuki et al. | 400/144.2 |
| 4,144,405 | 3/1979 | Wakamatsu | 400/479 X |
| 4,149,808 | 4/1979 | Matthias et al. | 400/144.2 |
| 4,281,938 | 8/1981 | Phillips | 400/171 |
| 4,289,412 | 9/1981 | Dollenmayer | 400/171 |
| 4,307,383 | 12/1981 | Brienza | 340/365 R |
| 4,307,968 | 12/1981 | Habich et al. | 400/171 |
| 4,326,193 | 4/1982 | Markley et al. | 340/365 R |
| 4,357,115 | 11/1982 | Or | 400/144.2 X |
| 4,406,552 | 9/1983 | Chervendinev et al. | 400/172 |
| 4,480,932 | 11/1984 | Willcox | 400/171 X |
| 4,494,884 | 1/1985 | Lowell | 400/144.2 |
| 4,534,664 | 8/1985 | Sawada | 400/110 |
| 4,594,683 | 6/1986 | Frank | 340/365 R X |

FOREIGN PATENT DOCUMENTS

| | | | |
|---|---|---|---|
| 0073841 | 3/1983 | European Pat. Off. | 400/656 |
| 2532762 | 1/1977 | Fed. Rep. of Germany | 400/473 |
| 2835997 | 3/1979 | Fed. Rep. of Germany | 400/149 |

(List continued on next page.)

OTHER PUBLICATIONS

IBM Technical Disclosure Bulletin, "Optical Keyboard", Matino, vol. 20, No. 2, Jul. 1977, pp. 641–642.
IBM Technical Disclosure Bulletin, "Talking Typewriter", Treseder, vol. 10, No. 10 Mar. 1968, pp. 1505–1506.
IBM Technical Disclosure Bulletin, "Adjustable Platen for Printers," Warren, vol. 24, No. 12, May 1982, p. 6333.

Primary Examiner—Ernest T. Wright, Jr.
Attorney, Agent, or Firm—Flehr, Hohbach, Test, Albritton & Herbert

[57] ABSTRACT

A keyboard assembly for selecting characters to be recorded includes a substrate carrying an array of characters arranged on one face thereof. A character selection device moves between advanced and retracted positions along each of two axes of the array and, by means of an optical viewfinder, registers a given character with respect to the position of the selecting device. Registration openings distributed along each of the two axes cooperate with an associated detent carried by the selecting device so as to retain the selecting device in a fixed position relative to the locus of the character which has been selected. Movement of the character selection device to the locus of a given character serves to control the recording of the character selected. Control of the recording of a selected character can be by positioning of print elements in response to the movement of the selection device, by generating signals identifying the locus of the selected character, or by transducing information signals identifying the selected character. A single operating device associated with the entire array of characters controls the recording of the characters. A keyboard as described has been mounted to be interchangeable with keyboards employing other fonts of characters.

10 Claims, 52 Drawing Figures

U.S. PATENT DOCUMENTS

| | | | |
|---|---|---|---|
| 2853707 | 7/1980 | Fed. Rep. of Germany | 400/472 |
| 3240386 | 5/1984 | Fed. Rep. of Germany | 400/86 |
| 0218039 | 1/1985 | German Democratic Rep. | 400/175 |
| 0084967 | 7/1981 | Japan | 400/174 |
| 0079543 | 5/1982 | Japan | 340/365 L |
| 0072862 | 5/1982 | Japan | 400/110 |
| 0093157 | 6/1982 | Japan | 400/144.2 |
| 0110464 | 7/1982 | Japan | 400/659 |
| 0126681 | 8/1982 | Japan | 400/86 |
| 0131580 | 8/1982 | Japan | 400/86 |
| 0152972 | 9/1982 | Japan | 400/86 |
| 0182465 | 11/1982 | Japan | 400/110 |
| 0036454 | 3/1983 | Japan | 400/171 |
| 0201656 | 11/1983 | Japan | 400/149 |

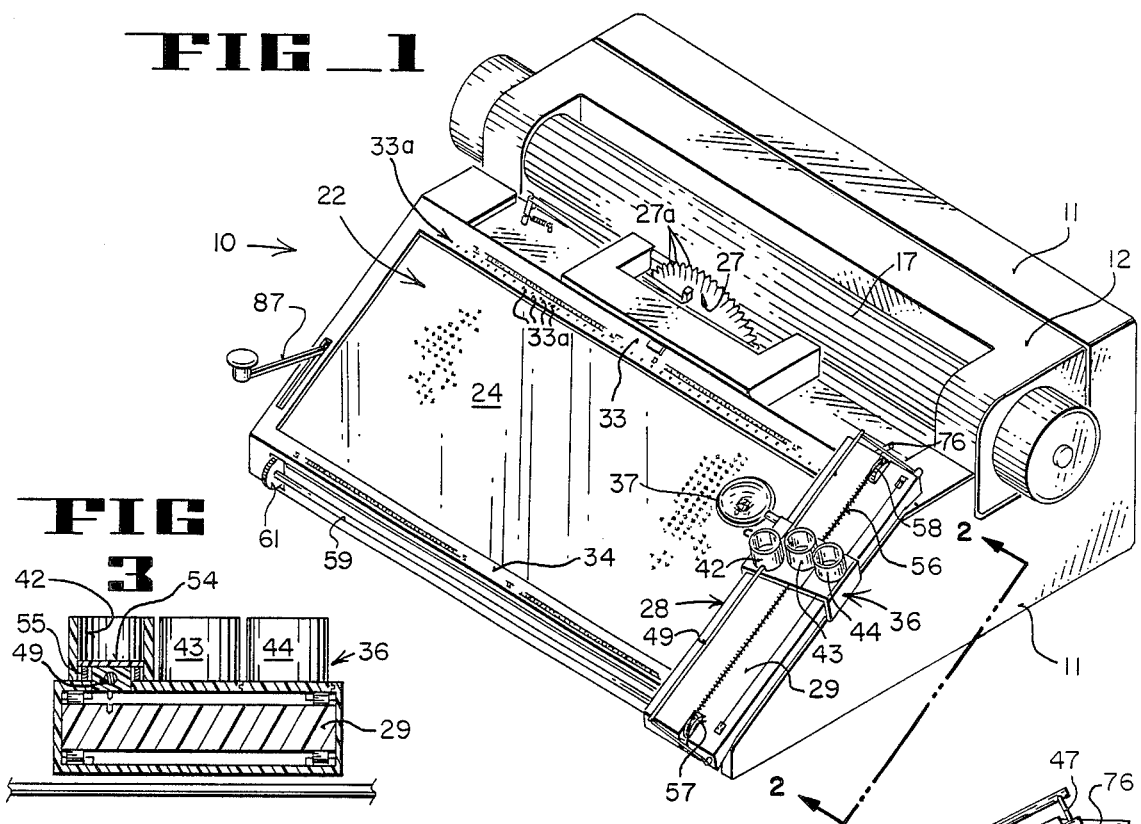
FIG_1
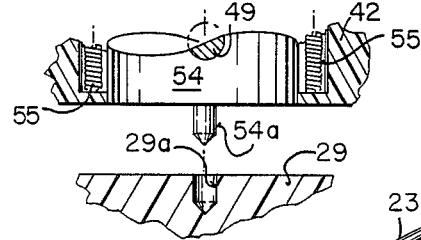
FIG_3
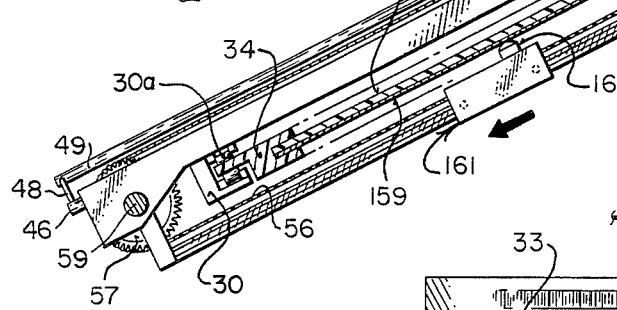
FIG_3A
FIG_2
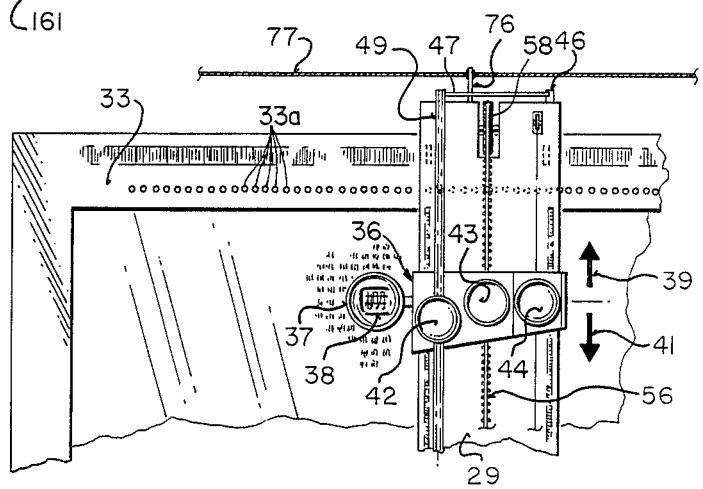
FIG_4

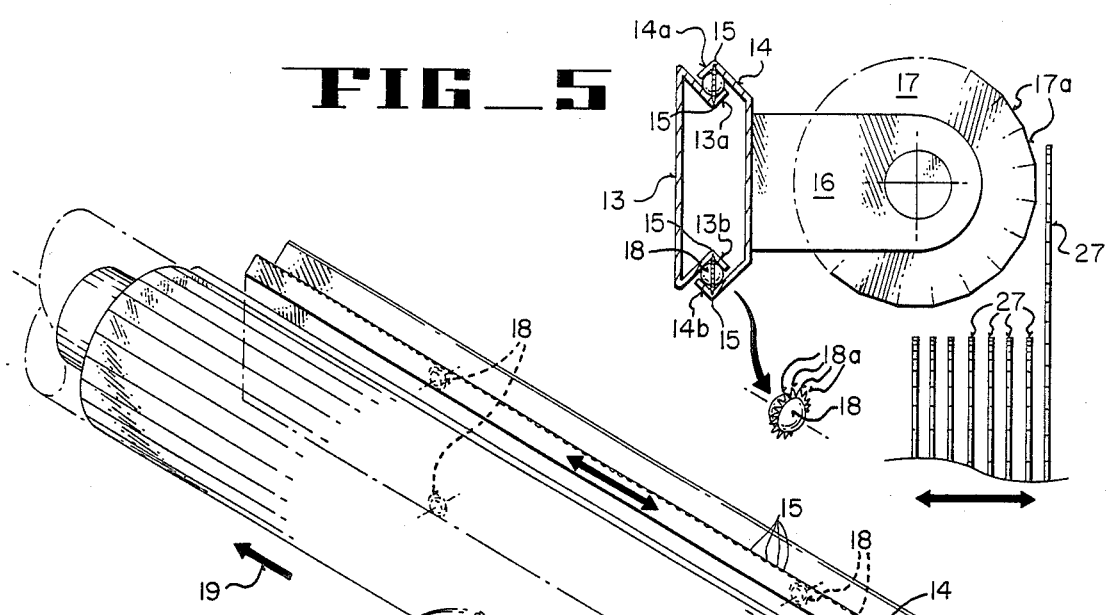
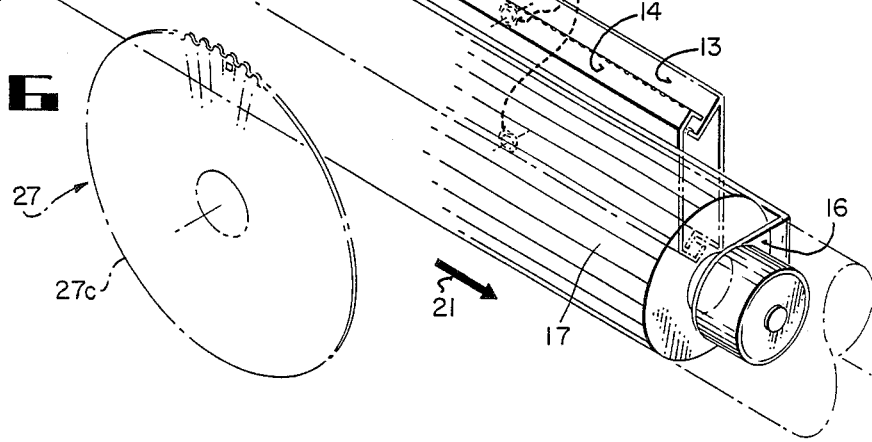
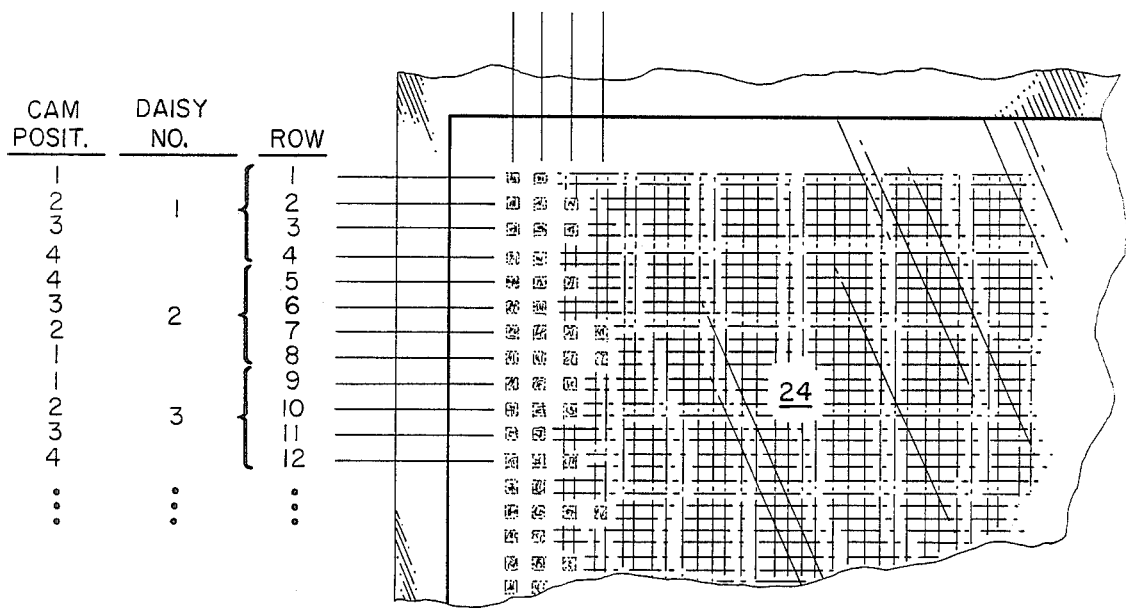

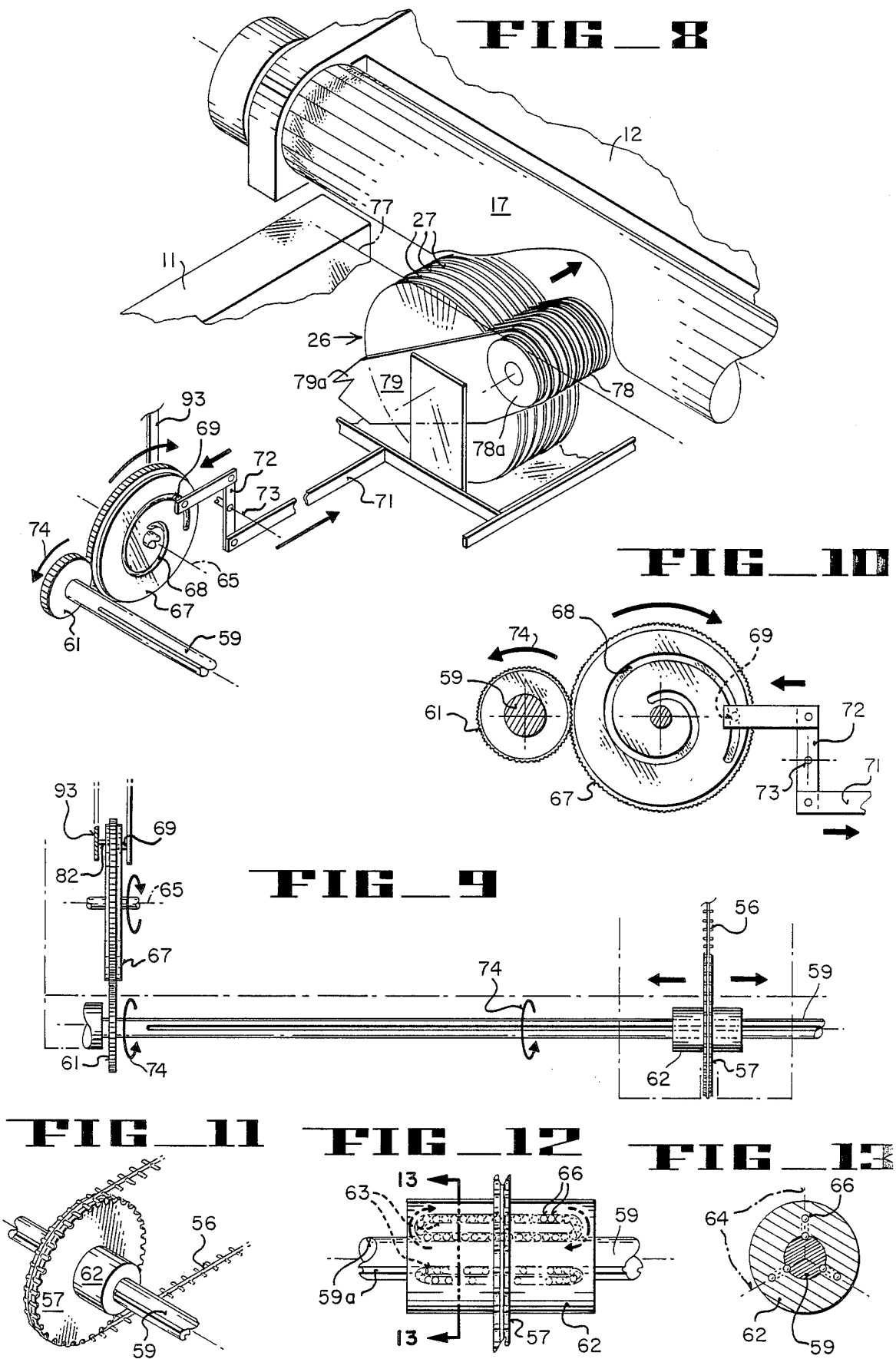

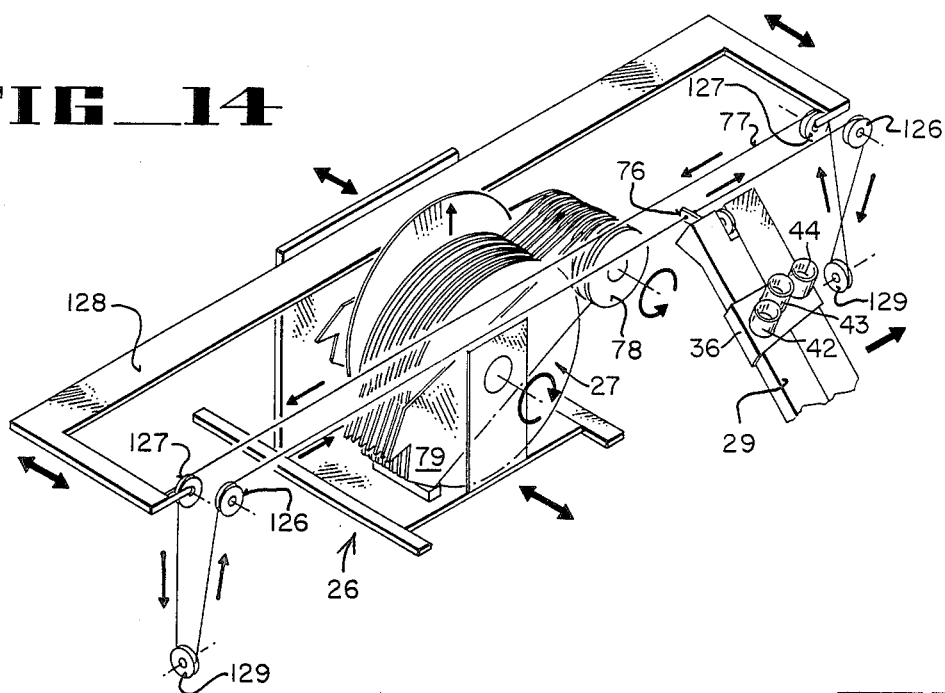
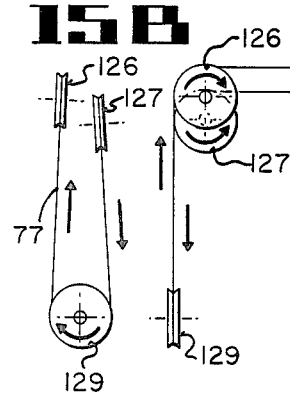
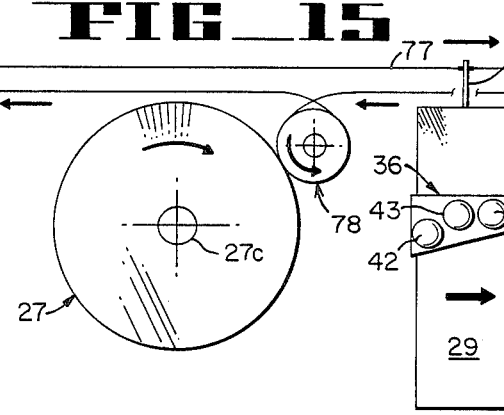
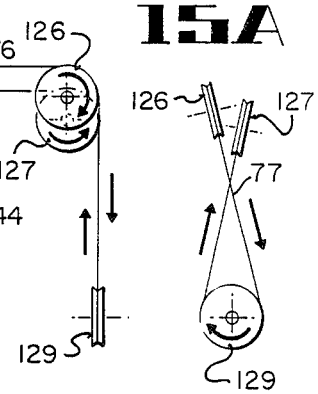
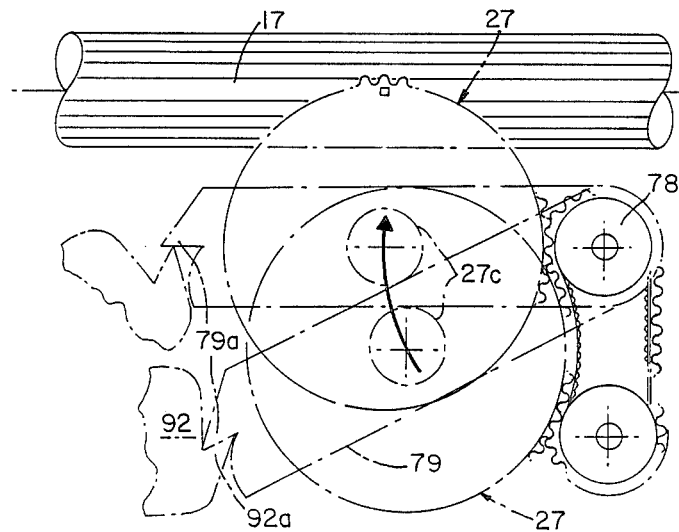
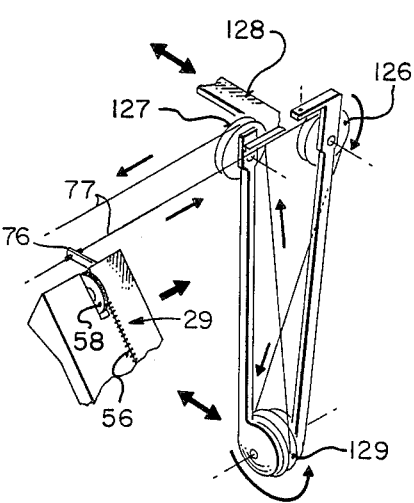

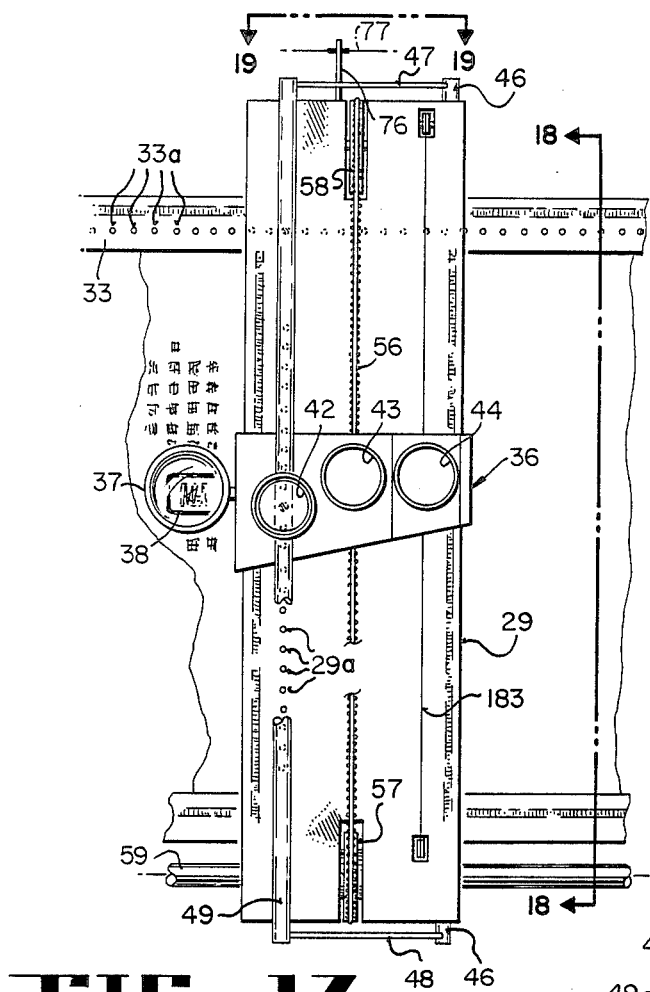
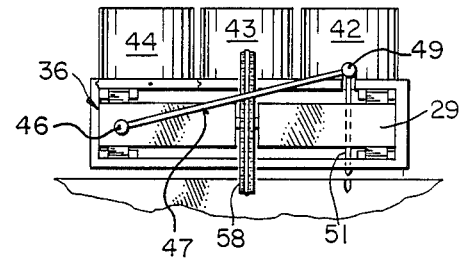
FIG_19
FIG_18
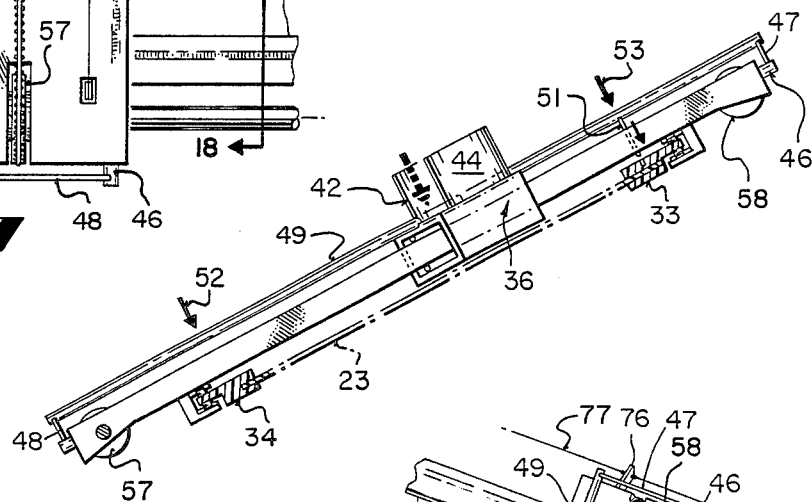
FIG_17
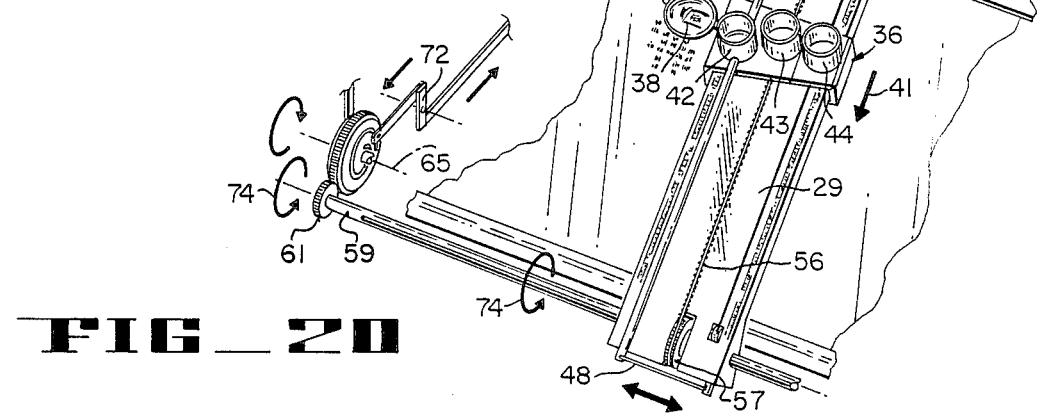
FIG_20

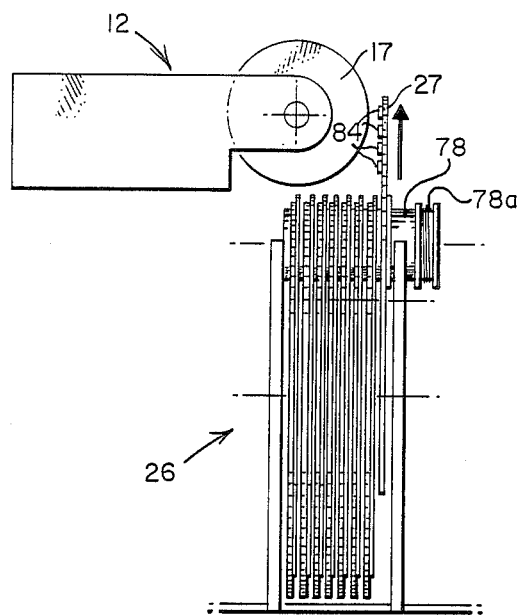
FIG_21
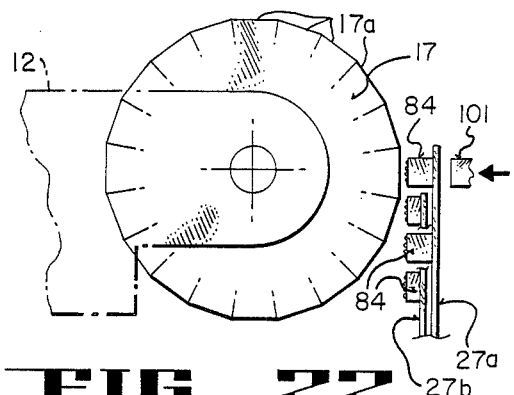
FIG_22
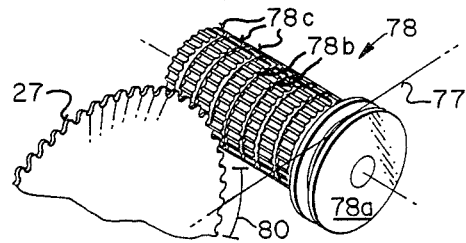
FIG_21A
FIG_24
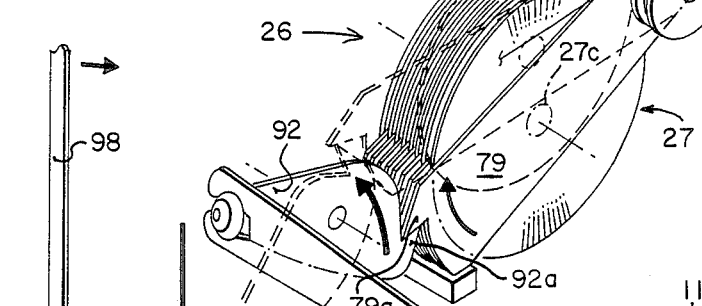
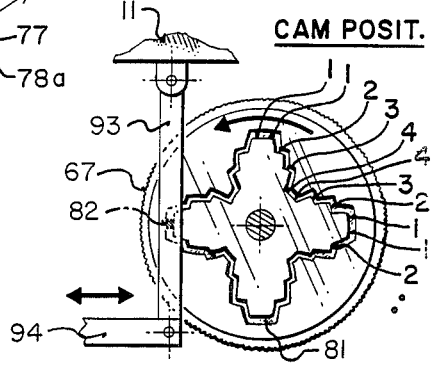
FIG_25
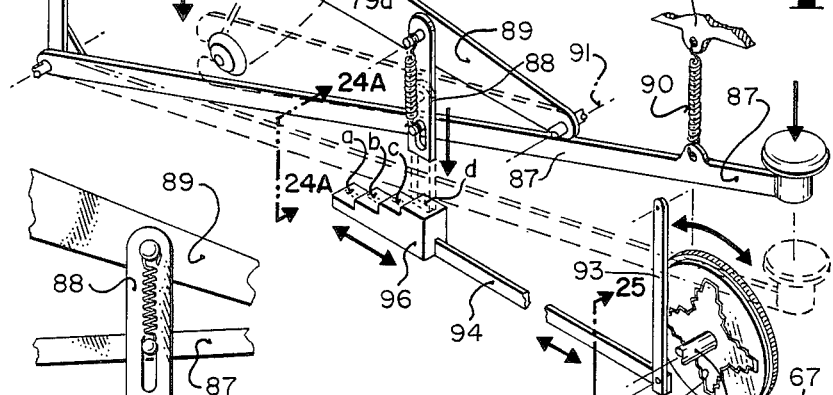
FIG_24A
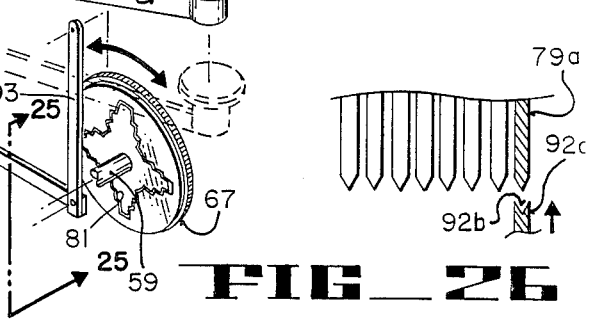
FIG_26

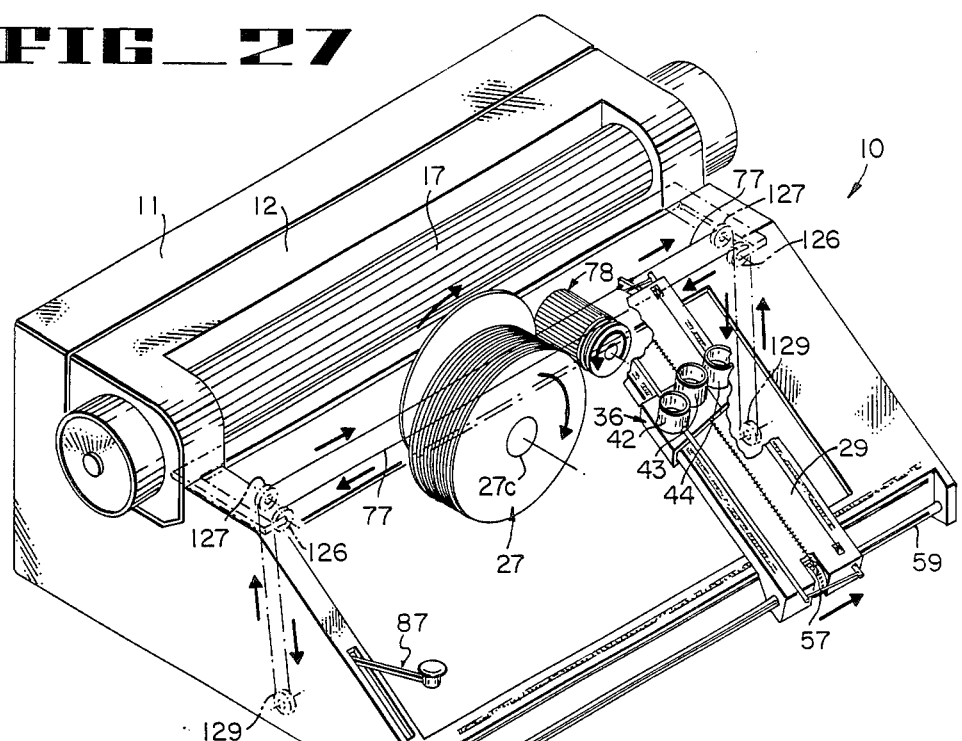
FIG_27
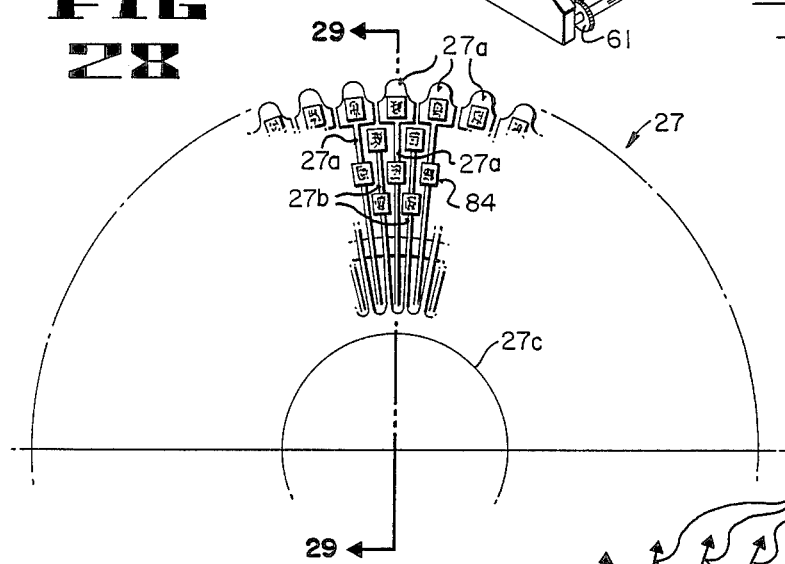
FIG 28
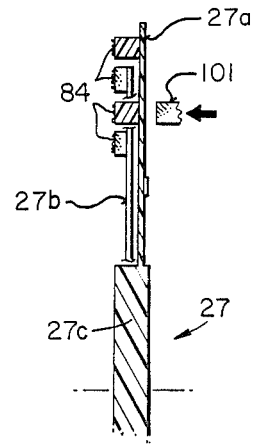
FIG_29
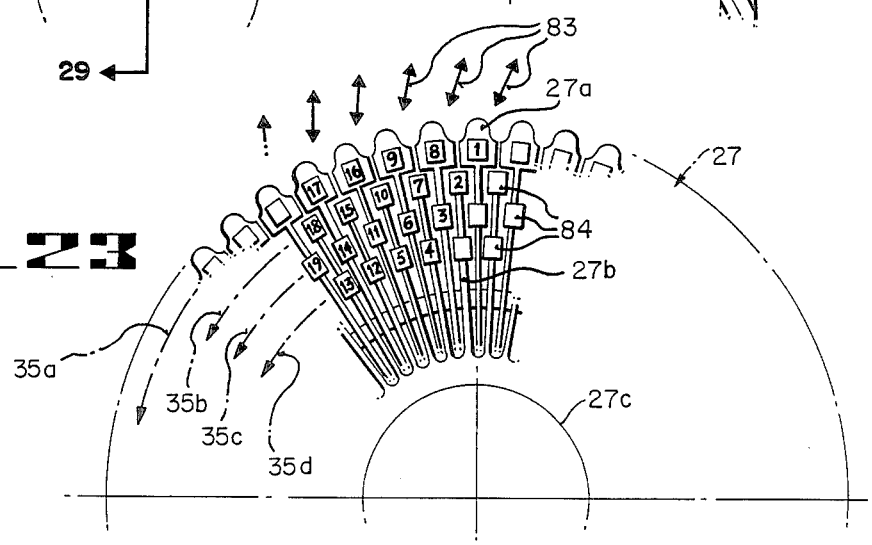
FIG_23

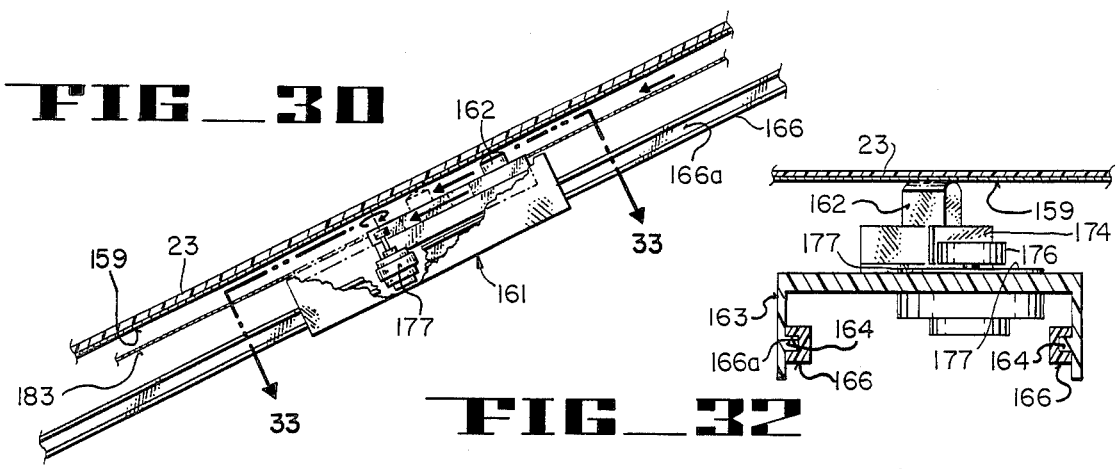
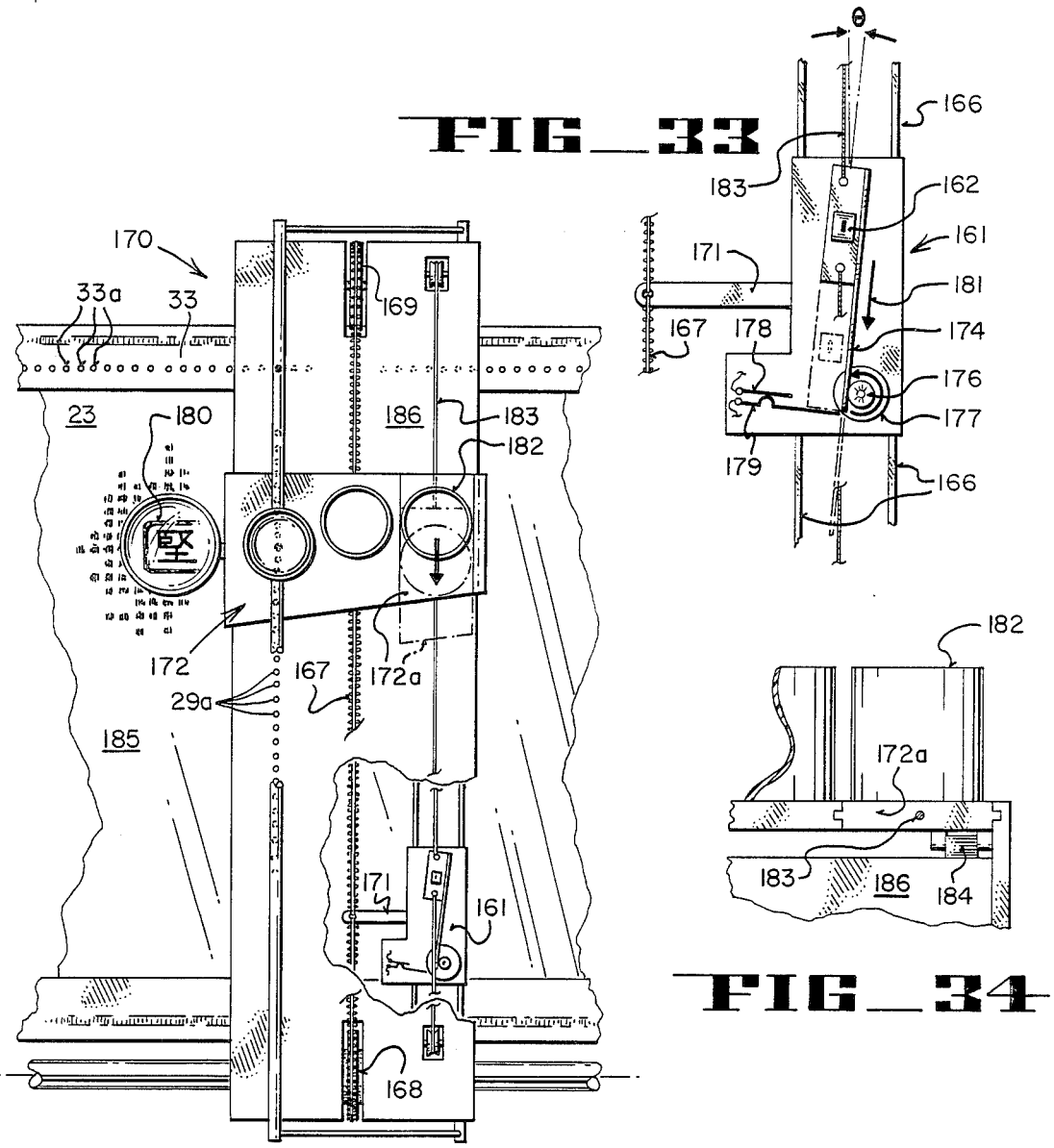

FIG_35
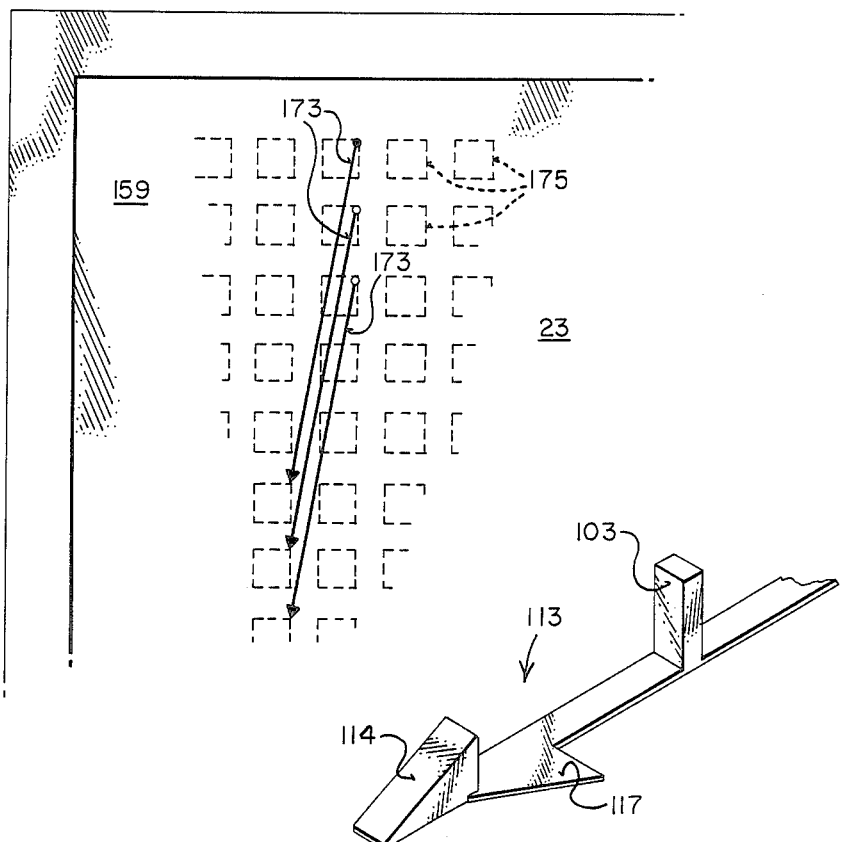
FIG_36A
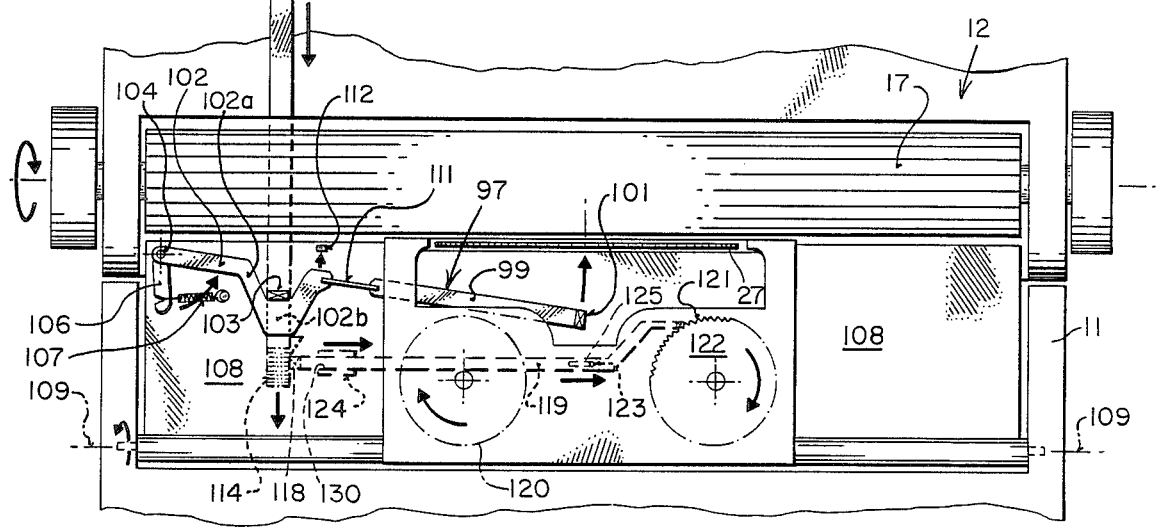
FIG_36

FIG_37
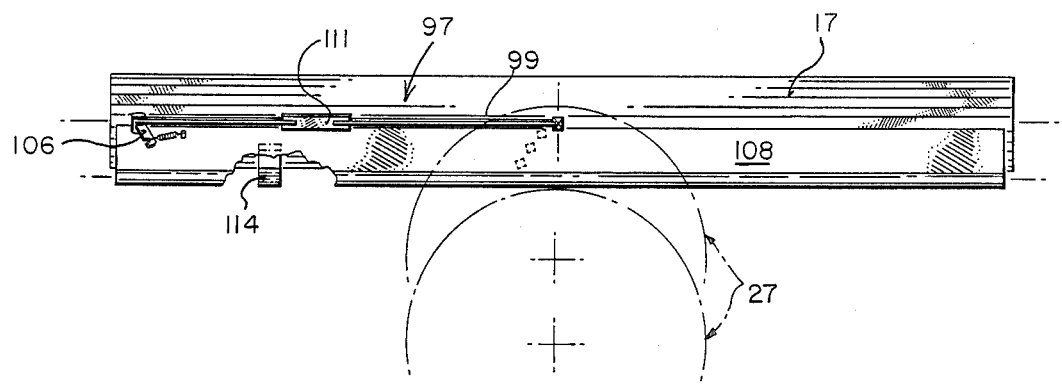
FIG_38
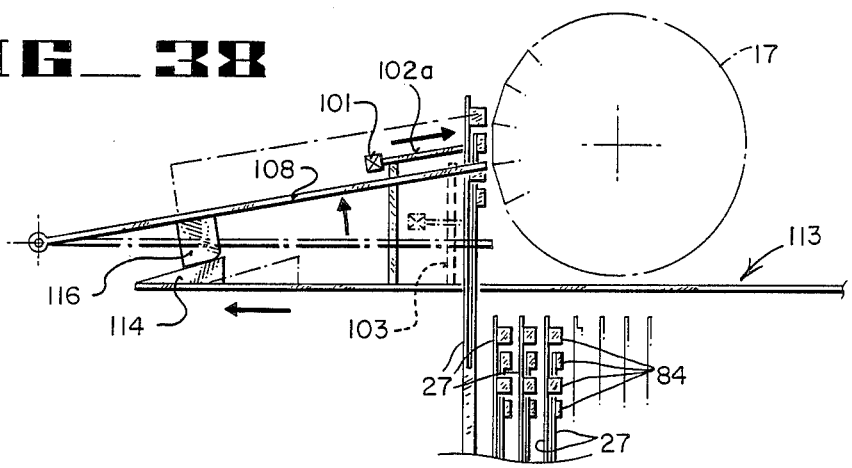
FIG_39
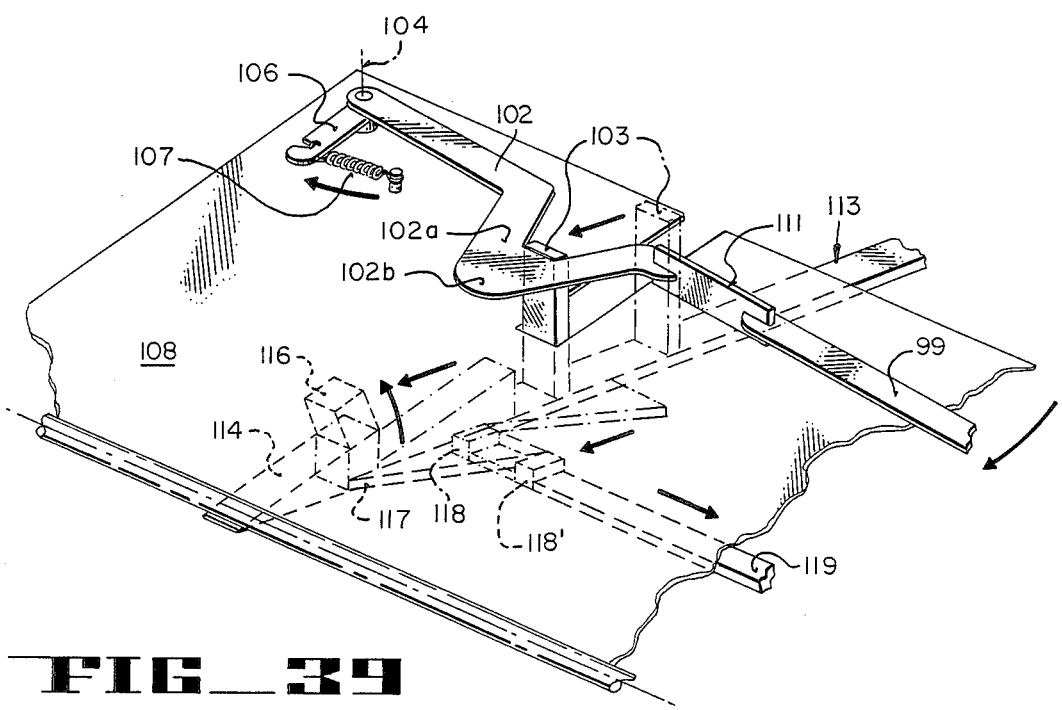

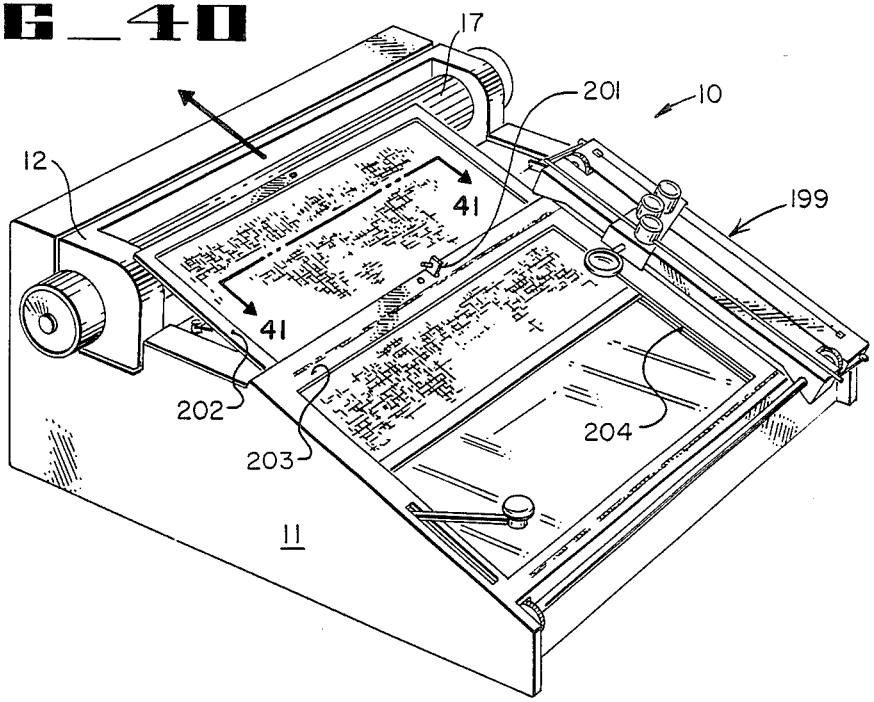
FIG_40
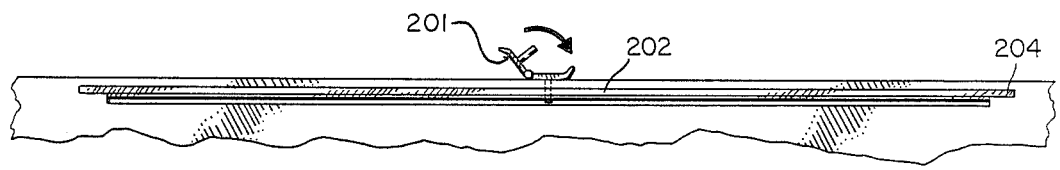
FIG_41
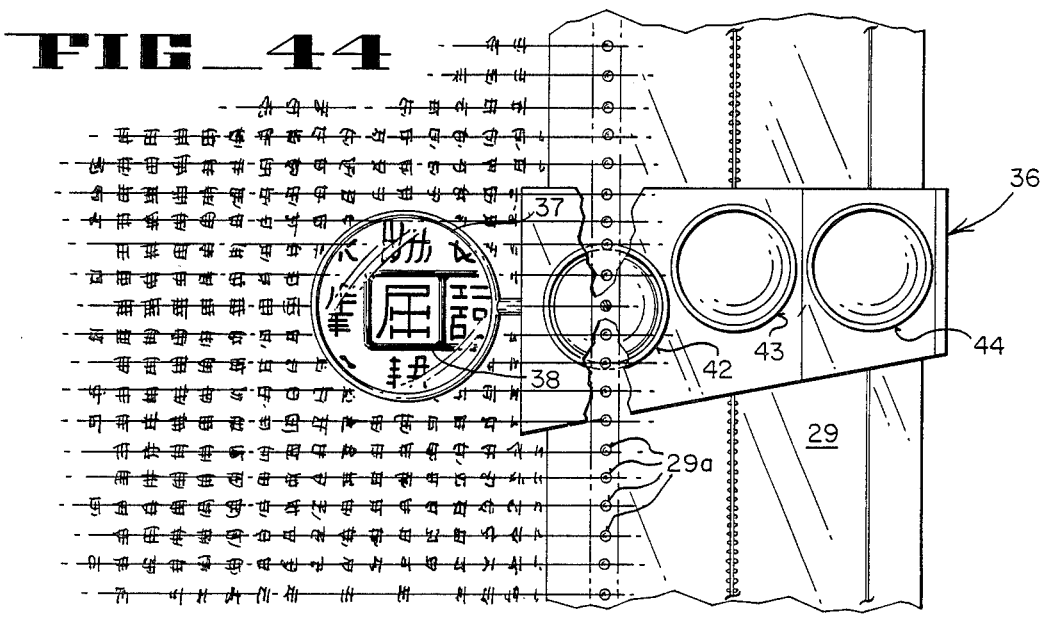
FIG_44

FIG_42
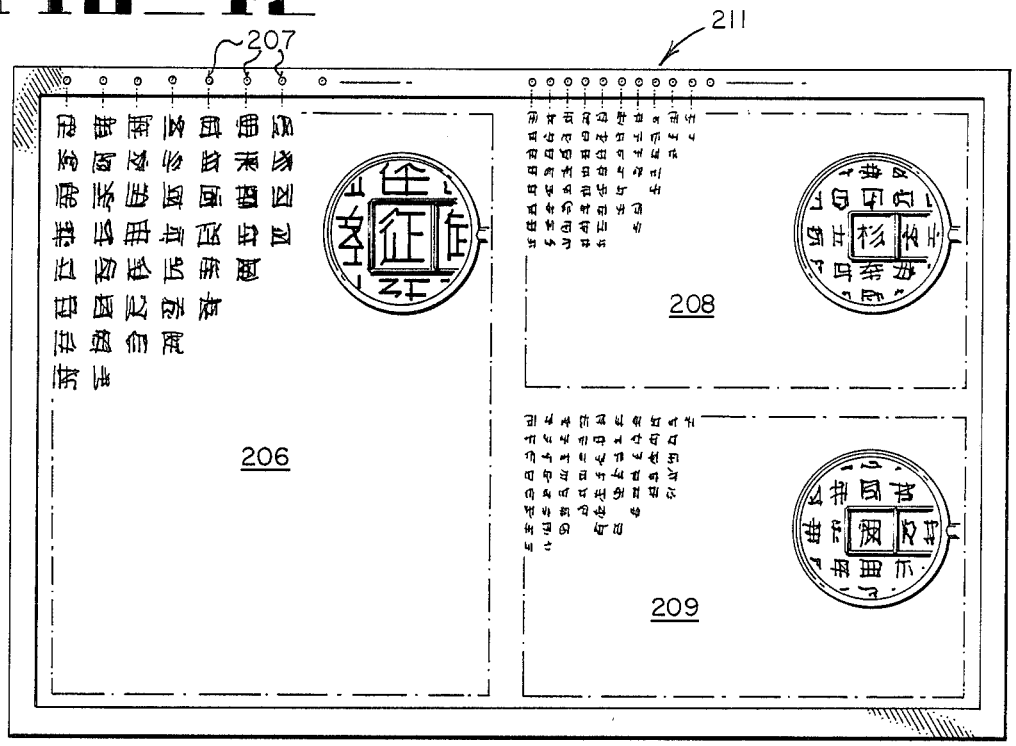
FIG_43
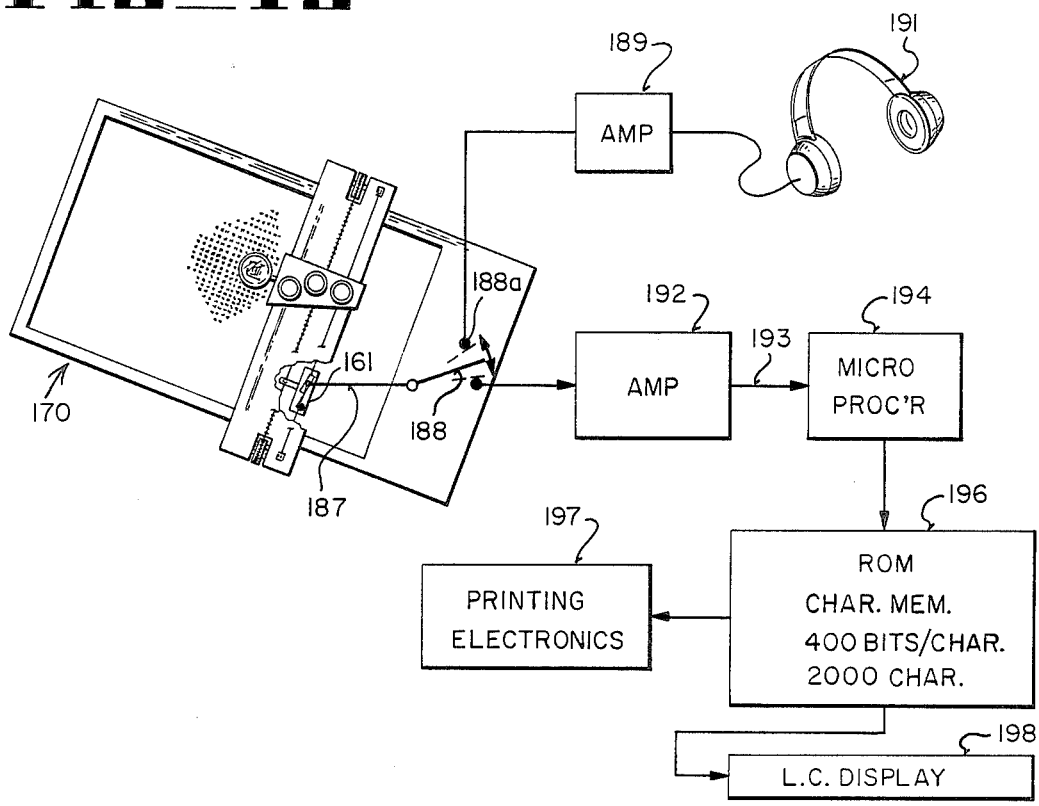

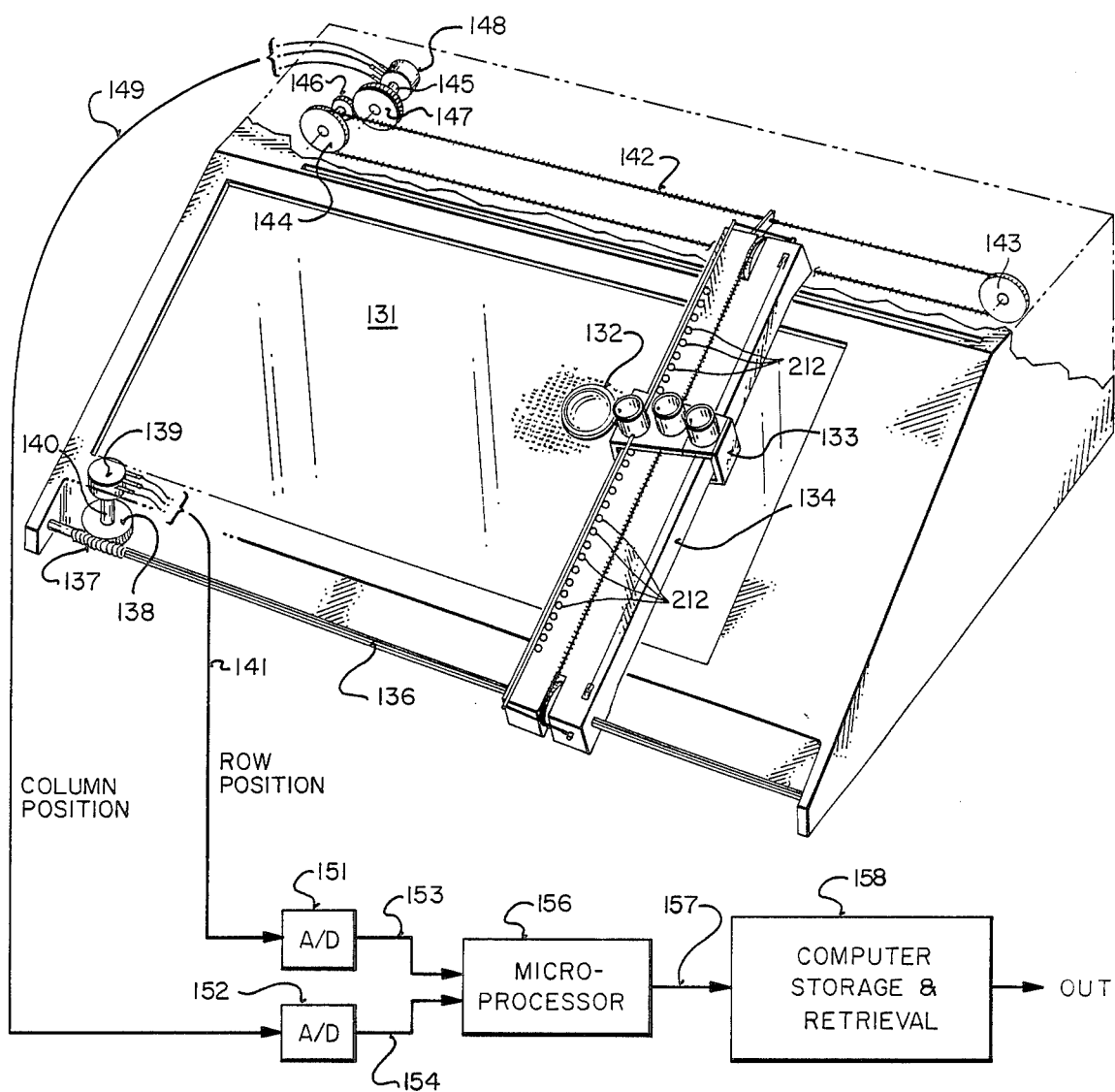
FIG_45

KEYBOARD ASSEMBLY AND RECORDING APPARATUS

This invention pertains to a keyboard assembly and more particularly to a keyboard assembly particularly useful in selecting characters or other information for controlling recording apparatus of various types.

BACKGROUND OF THE INVENTION

One particular embodiment of a keyboard assembly according to the invention operates a novel typewriter having in excess of 2,000 characters individually selectable for printing.

Another embodiment of a keyboard assembly according to the invention generates a digital address controlling a prerecorded storage of characters to be printed.

Yet another embodiment of the keyboard assembly according to the invention generates digital signals representing selected characters and serving to address a data storage with respect to the characters selected.

Yet a further embodiment of a keyboard assembly according to the invention serves to transduce pre-recorded address information associated with each visually selected character for electronically controlling printing, typing or other recording of characters selected.

In addition, another embodiment of a keyboard assembly according to the invention serves to provide an audio reproduction of each character selected so as to reinforce the proper pronunciation of the characters of a given font.

In addition to the above embodiments, a keyboard assembly according to the invention includes a number of novel aspects and features as described further below.

Heretofore, keyboards of a type, for example, as used to type characters selected from a group of characters, or font, have employed a corresponding number of complete key assemblies each capable of operating an associated print element. While such an arrangement has been suitable for the keyboard of a conventional typewriter having something on the order of 45 keys associated with print elements, it becomes prohibitively expensive where the assortment of characters (or font) includes an excessive number of characters to be recorded, for example, as in typing Chinese ideographs, where the font can exceed 2,000 characters (or ideographs).

SUMMARY OF THE INVENTION AND OBJECTS

In general, the keyboard assembly for selecting characters to be recorded, as disclosed herein, includes a substrate carrying an array of characters arranged on one face of the substrate. Character selection means moves between advanced and retracted positions along each of two axes to a locus associated with each of the characters. Means responsive to the movement of the character selection means to the locus of a given character in the array serves to select the character to be recorded. The last named selected can be by positioning of print elements in response to the movement or can be provided by generating signals identifying the selected locus or character.

In general, it is an object of the present invention to provide an improved keyboard assembly readily adaptable for the selection of any one of a number of characters to be recorded.

A further object of the invention is to provide a keyboard assembly of a type presenting all characters on a common substrate and employing means for selecting a given character to be recorded simply by movement of a selection device along each of two axes across the array of characters.

Another object of the invention is to provide a keyboard assembly having an array of characters disposed on a common substrate and means for selecting a given character whereby the geographical positioning of the selecting means into optical registration with the selected character provides information indicating the locus of the selected character.

Yet an additial object of the invention is to provide a keyboard assembly for positioning a given one of a number of characters for printing the given character, as in a typewriter.

An additional object of the invention is to provide a keyboard assembly and print element selection arrangement adapted to provide a Chinese typewriter at limited expense.

A further object of the invention is to provide a keyboard assembly for addressing an electronic data storage system in response to optically registering a selector means with a character printed in an array thereof.

Another object of the invention is to provide a typewriter or other keyboard retaining means characterized by an interchangeable keyboard in which each character is directly associated with a pre-recorded identification of that character.

The foregoing and additional objects of the invention will be more readily evident from the following detailed description of preferred embodiments when considered in conjunction with the drawings.

BRIEF DESCRIPTION OF THE DRAWINGS

FIG. 1 shows a diagrammatic perspective view of a typewriter construction according to a first embodiment of the invention;

FIG. 2 shows a side elevation view taken along the line 2—2 of FIG. 1;

FIG. 3 shows an elevation section view taken along the line 3—3 of FIG. 2;

FIG. 3A shows an enlarged detail diagrammatic elevation section view of a portion of FIG. 3;

FIG. 4 shows an enlarged detail diagrammatic plan view of a portion of FIG. 1;

FIG. 5 shows a diagrammatic end view of a platen mounted for transverse movement;

FIG. 6 shows a diagrammatic perspective view of a back-mounted platen associated with a printing unit;

FIG. 7 shows a diagrammatic chart for purposes of explanation;

FIG. 8 shows a diagrammatic perspective view of means for moving a group of daisy wheels between advanced and retracted positions;

FIG. 9 shows a diagrammatic plan view of the drive train for moving the group of daisy wheels shown in FIG. 8;

FIG. 10 shows a drive gear and linkage arrangement for moving the group of daisy wheels of FIG. 8 between advanced and retracted positions;

FIG. 11 shows a diagramamtic enlarged perspective view of a drive gear and positive displacement belt as shown in FIG. 9;

FIG. 12 shows a diagrammatic elevation view of a splined boss and gear arrangement as shown in FIG. 11 for movement along a drive shaft;

FIG. 13 shows a transverse section view taken along the line 13—13 of FIG. 12;

FIG. 14 shows a diagrammatic perspective view of a group of daisy wheels and means for rotating and moving same between advanced or retracted positions for purposes of explanation;

FIGS. 15, 15A, 15B, and 15C show diagrammatic views showing the operation of apparatus represented in FIG. 14 for purposes of explanation;

FIG. 16 shows a diagrammatic front elevation view of an alternative arrangement for rotating the daisy wheels shown in FIG. 14;

FIG. 17 shows an enlarged diagrammatic plan view of character selection means according to the invention;

FIG. 18 shows a diagrammatic elevation section view taken along the line 18—18 of FIG. 17;

FIG. 19 shows a diagrammatic elevation view taken along the line 19—19 of FIG. 17;

FIG. 20 shows a diagrammatic perspective view of a keyboard assembly according to the invention with portions broken away for clarity;

FIG. 21 shows a diagrammatic end elevation view of a group of daisy wheel print units cooperating with a back-mounted platen;

FIG. 21A shows an enlarged diagrammatic perspective view of a capstan per se for rotating the daisy wheels;

FIG. 22 shows an enlarged detail end view of a platen and print elements of adjacent petals of a given daisy wheel disposed in the printing plane;

FIG. 23 shows a diagram of a novel daisy wheel arranged to provide larger characters;

FIG. 24 shows a diagrammatic perspective view of means for moving a given portion of a daisy wheel into position for printing;

FIG. 24A shows an enlarged detail of FIG. 24 taken along the line 24A—24A;

FIG. 25 shows an enlarged side elevation view, viewed in the direction of section line 25—25 of FIG. 24, of a positioning cam employed in the apparatus shown in FIG. 24;

FIG. 26 shows an enlarged diagrammatic detail view of the bottom edges of the daisy wheel support arms cooperating with a daisy wheel lifter element shown in FIG. 24;

FIG. 27 shows a diagrammatic perspective view of a typewriter assembly employing a keyboard according to the invention;

FIG. 28 shows an enlarged view of several adjacent petals of a daisy wheel as employed herein;

FIG. 29 shows an enlarged detail view of a given daisy wheel taken along the line 29—29 of FIG. 28;

FIG. 30 shows an enlarged diagrammatic side elevation section view of a portion of the keyboard assembly with portions of a magnetic transducer drive arrangement broken away for clarity;

FIG. 31 shows an enlarged plan view of a portion of a keyboard assembly according to the invention showing a magnetic transducer drive assembly located beneath the character selector carriage;

FIG. 32 shows an end elevation view of a magnetic transducer drive assembly;

FIG. 33 shows a diagrammatic plan view of a magnetic transducer drive assembly taken along line 33—33 of FIG. 30;

FIG. 34 shows an enlarged elevation detail of a portion of FIG. 31;

FIG. 35 shows an enlarged diagrammatic illustration of the back of a keyboard substrate for explanation;

FIG. 36 shows a diagrammatic plan view of a portion of a typewriter having means for striking a given print element;

FIG. 36A shows a diagrammatic perspective view of a print hammer operating member for the structure shown in FIG. 36;

FIG. 37 shows a diagrammatic elevation view with a portion broken away for clarity of a print hammer assembly for use in a typewriter according to the invention;

FIG. 38 shows a diagrammatic illustration of means for cocking and releasing the print hammer assembly;

FIG. 39 shows a diagrammatic perspective view in enlarged and simplified detail of a print hammer operating mechanism;

FIG. 40 shows a diagrammatic perspective view of a typewriter employing a removable keyboard assembly;

FIG. 41 shows an end elevation detail viewed along the line 41—41 of FIG. 40;

FIG. 42 shows a diagrammatic plan view of an alternative keyboard arrangement having increased information density;

FIG. 43 shows a diagrammatic view of a keyboard assembly employed to address a magnetic storage for controlling a printing machine;

FIG. 44 shows an enlarged detail of an array of characters to be recorded;

FIG. 45 shows a diagrammatic perspective view of a system wherein the geographic position of a character selection device within a given array of characters on the keyboard serves to generate signals identifying the character.

DETAILED DESCRIPTION OF PREFERRED EMBODIMENTS

In general, a keyboard assembly and recording apparatus in the embodiment of a typewriter 10 includes a character selecting mechanism or assembly 28, a printing unit 27 responsive to selection of a given character so as to position a print element 84 (FIG. 29) in position to be printed, and means for striking the selected print element 84 so as to effect recording upon paper inserted in the typewriter 10, all as described in detail further below.

Typewriter 10 includes a frame 11 carrying a transversely movable platen assembly 12. Assembly 12 carries platen 17 mounted from the rear of typewriter 10 as shown best in FIGS. 5 and 6. Thus, a stationary bracket 13 carries a transversely movable bracket 14 formed with a pair of mounting arms 16 for supporting the ends of a rotatable platen 17.

Brackets 13, 14 provide pairs of confronting troughs 13a, 14a and 13b, 14b. At the apex of each trough (13a, 13b), (14a, 14b) a series of uniformly spaced openings 15 are disposed in confronting relation. Bearings 18 of known type are formed with a series of projectios 18a disposed on a mid-plane of the bearing 18 to engage openings 15 along the confronting troughs 13a, 14a and 13b, 14b.

Platen 17, while generally cylindrical, is formed to include a series of discrete flat striking surfaces 17a, each defining a chord on the exterior surface of the platen 17.

As shown in FIG. 6 the arrow 19 represents the presence of an escapement mechanism of known design whereby after printing of each character platen 17 will advance leftwardly. Arrow 21 correspondingly represents the presence of a suitable carriage return mechanism.

A keyboard 22 comprises a substrate 32 carrying an array 24 of characters arranged on one face thereof. The array 24 preferably is arranged in columns and rows as shown, for example, in FIGS. 7 and 44.

A printing assembly 26 as shown in FIG. 8, includes a group of printing units 27 (such as the daisy wheels shown in FIGS. 23 and 28). Preferably, as disclosed herein, daisy wheels 27 include a central hub 27c a number of radially extending petals 27a, 27b of different lengths.

In order to permit each petal 27a, 27b to carry a plurality of relatively large characters such as Chinese ideographs as represented in FIG. 28, petals 27a extend beyond petals 27b whereby alternate petals 27a, 27b of each printing unit 27 will differ in length to a predetermined degree. Thus, the two print elements 84 carried on each petal 27a, 27b can be relatively widely spaced along the length of their petal to permit the print element 84 to be sufficiently enlarged to carry a Chinese ideograph.

The printing unit or daisy wheel 27 is shown in FIG. 23 for purposes of explanation noted herein below. Thus, the various print element 84 have been marked (for explanation only) with a sequence of numbers indicating the order in which the print elements 84 become positioned by cam track 81 as hereinafter described.

Character selection means movable to the locus of each of the characters appearing in array 24 on keyboard 22, and means responsive to such movement include means for selecting a given (daisy wheel) print unit 27 in response to movement of the selector means along a first axis and for rotating the print units 27 in response to movement of the selector means along a second axis, laterally across array 24.

The character selecting assembly 28 includes a carriage 29 having a pair of roller brackets 30, 31 depending underneath and containing in each instance a pair of confronting rollers 30a, 31a. Each pair of rollers 31a, 30a is adapted to engage the top and bottom surfaces of a transversely extending frame element 33, 34 which support the upper and lower edge margins of substrate 23. Thus, assembly 28 can be moved laterally across the array 24 of characters into registration with a given column of characters.

Selecting assembly 28 further includes means or slide assembly 36 movable along carriage 29 to pass across the rows of characters for optically locating a given character to be printed. Once the character has been optically located, carriage 29 is securely registered at a locus associated with the character selected.

Accordingly, a finger-operated, row selecting slide assembly 36 carries a character reading glass 37 marked or containing means such as a rectangular wire 38 serving as a viewfinder for optically registering a given character within the bounds of the viewfinder.

As noted above, slide assembly 36 moves along carriage 29 in the direction of arrows 39, 41. Movement of slide assembly 36 is effected with the tips of a person's fingers inserted into three "thimbles" 42, 43, 44.

As thus arranged, slide assembly 36 includes an optical viewfinder 38 including means for optically registering viewfinder 38 with respect to a given character on the keyboard 22. In addition, detent means 54a engage slide assembly 36 and carriage 29 to retain selection assembly 28 in a fixed position or locus along each of two axes with respect to the columns and rows of the array 24 of characters when viewfinder 38 is aligned with a given character. Thus, means serving to retain assembly 28 against lateral movement includes a rod 46 (FIGS. 4, 17 and 19) forming a pivot or hinge extending lengthwise of carriage 29. A pair of cross arms 47, 48 engage a detent operating rod 49 as now to be described.

The upper frame element 33 includes a sequence of spaced registration openings 33a corresponding to the spacing between columns of characters on keyboard 22.

Detent operating rod 49 passes freely through thimble 42 to connect the ends of cross arms 47, 48. In this way depression of detent operating rod 49 at any place along its length will move an associated detent pin 51 into an opening 33a formed in frame element 33 and associated with the column containing the character selected. Thus, as shown in FIG. 18, arrows 52, 53 represent a substantially equally distributed downward force applied to detent operating rod 49 in response to downward movement applied thereto via button 54 in thimble 42.

As shown in FIGS. 3A and 19, thimble 42 includes a button 54 yieldingly urged upwardly by springs 55 for lifting detent operating rod 49. Button 54 includes an opening therethrough carrying detent operating rod 49 whereby button 54 can be depressed downwardly to move operating rod 49 and detent pin 51 into an associated registration opening 33a.

Accordingly, means have been provided for registering and retaining character selecting assembly 28 with respect to a given column of characters.

Means for registering and retaining viewfinder 38 with respect to a given row of characters includes the downwardly depending detent pin 54a of button 54 disposed to engage one of a series of registration openings 29a (FIG. 44) formed along carriage 29. Accordingly, the spacing between openings 29a corresponds to the spacing between rows of characters on keyboard 22.

Movement of slide assembly 36 along carriage 29 serves to select a given one of the printing units or daisy wheels 27 whereas lateral movement of carriage 29 serves to orient a given print element 84 (FIG. 23) of the selected print unit 27 in position for printing, as now to be described.

A positive displacement drive belt 56, (FIG. 11) trained about a drive gear 57 and an idler gear 58 and coupled at its ends to slide assembly 36 serves to rotate a splined shaft 59 and a drive gear 61.

As shown in FIGS. 12 and 13, a cylindrical boss 62 arranged to readily slide laterally along splined shaft 59 carries gear 57. Accordingly, shaft 59 includes keyways or grooves 59a. Boss 62 includes three oval shaped channels 63 each forming a bearing race containing a number of ball bearings 66 therein. Channels 63 include pairs of parallel sides lying in a radial plane 64 with the inner side of the bearing race or track being open to the splined groove 59a extending along shaft 59. In this way, ball bearings 66 travel freely around an associated race to permit boss 62 to move along shaft 59 while at the same time serving to provide an interlock whereby rotation of gear 57 serves to rotate shaft 59 and its associated drive gear 61.

Rotation of drive gear 61 serves to rotate a face cam 67. One side of face cam 67 as shown in FIG. 8 includes a "snail" cam track 68 for engaging a cam follower 69. Movement of cam follower 69 serves to advance and retract printing assembly 26 in response to operation of a linkage comprising, as diagrammatically illustrated in FIG. 8, an elongate connecting rod 71 and a pivot arm 72 mounted on a fixed pivot 73.

Thus, a slide assembly 36 moves downwardly toward the foot of keyboard 22, drive belt 56 rotates shaft 59 in the direction of arrow 74 (FIG. 9). Rotation of shaft 59 rotates gear 61 in the same direction and, in turn, rotates face cam 67 in an opposite direction.

As shown best in FIG. 8, as face cam 67 rotates clockwise about a fixed axis of rotation 65, cam follower 69 travels along track 68 to be drawn rearwardly. As cam follower 69 moves rearwardly, the connecting rod 71 moves fowardly to position one of the printing units or daisy wheels 27 in a plane lying in front of platen 17 where it can be lifted into a position to be properly struck as described further below. (See FIGS. 21, 22). Daisy wheels 27 each carry a plurality of print elements 84, one above the other in spaced relation along an associated petal 27a or 27b. A striker element 101 moves each petal 27a, 27b and both print elements 84 thereon toward platen 17. However, by providing sufficient spacing along petals 27a, 27b, only one print element 84 can engage a print surface 17a of platen 17 (as shown in FIG. 22).

Briefly, movement of carriage 29 laterally across keyboard 22 serves to rotate all printing units or daisy wheels 27 simultaneously so as to maintain alignment of the petals 27a, 27b (and print elements 84) thereof.

The upper end of carriage 29 includes a protruding finger 76 for attachment to a cable 77. Cable 77 wraps about a drum portion 78a of a drive capstan assembly 78 (FIG. 21A). Capstan 78 includes spaced parallel slots 78b for receiving the pivot end of lifting arms 79 to maintain arms 79 (and daisy wheels 27) in spaced relation. Further, the smooth slots 78b permit capstan assembly 78 to rotate freely without pivoting the arms 79 upwardly. However, the fluted surface of capstan assembly 78 defines a plurality of gear portions 78c (separated by slots 78b) to be driven as a unit while engaging the gear-like periphery of the daisy wheels 27. (Note FIGS. 14 and 27.) In addition, capstan assembly 78 carries a number of lifting arms 79 which are freely movable with respect to the rotation of capstan assembly 78. Printing assembly 26 includes a plurality of lifters or lifting arms 79 pivotally carried in spaced relation on capstan assembly 78. Each lifting arm 79 carries an associated one of the daisy wheels or print units 27 whereby lifting of an arm 79 serves to lift a given daisy wheel 27 upwardly into printing position.

As carriage 29 moves to the right (as shown in FIG. 14), cable 77 moves in the direction of the arrows associated therewith. By virtue of the fact that cable 77 has been wrapped about the drum end 78a of capstan assembly 78, all printing units 27 will rotate in response to the lateral displacement of carriage 29. As noted above, this lateral displacement of carriage 29 serves to correspond to a given column position on keyboard 22.

As shown in FIG. 25, the other face of cam 67 has been formed with a cam track 81 serving to step a cam follower 82 therealong in a sequence of discrete positions pursuant to rotation of face cam 67. As shown in FIG. 23, as printing unit 27 is rotated to a selected position corresponding to a character position, the print unit 27 will be lifted upwardly at an angle as indicated by the arrows 83. Accordingly, commencing with the righthand arrow 83, print elements 84 will be positioned for printing in the sequence indicated by the numbers shown thereon in FIG. 23.

Accordingly, each petal 27a, 27b of daisy wheel 27 carries first and second print elements 84 disposed therealong in spaced relation. Alternate petals 27a, 27b differ in length to a predetermined degree whereby print elements 84 travel in four concentric circular paths 35a–35d in response to rotation of daisy wheel 27. Print elements 84 are disposed in a predetermined sequence associated with successive rows of characters on keyboard 22 as described below with respect to FIG. 24. The predetermined sequence of print elements 84 disposes four print elements 84 taken from four successive adjacent petals 27a, 27b and successively from four concentric paths 35a–35d. In this manner, as a given daisy wheel 27 is lifted for printing its gear-like periphery 80 (FIG. 21A) engages an associated gear portion 78c (FIG. 21A), to cause daisy wheel 27 to roll upwardly therearound. The foregoing movement serves to properly position a selected print element 84 along a diagonal path as herein described.

Means for selecting one of the four diagonal positions indicated, for example, by the numbers 1, 2, 3, 4 or indicated by numbers 8, 7, 6, 5 as shown on the print unit 27 of FIG. 23 includes means now to be described with respect to FIG. 24. Accordingly, means responsive to selection of a given character serves to position a print element 84 associated with the selected charcter in position to be printed.

Accordingly, as slide assembly 36 moves downwardly across keyboard 22, face cam 67 rotates to move printing assembly 26 between advanced and retracted positions as described above for purposes of selecting a given one of a number of printing units 27. The apparatus is arranged whereby, as noted in FIG. 7, the first four rows are associated with the first daisy wheel 27, the next four rows are associated with the second daisy wheel 27, the next four rows of characters are associated with the third daisy wheel 27, etc. In order to discriminate between a given one of the four rows of characters associated with any given daisy wheel 27, cam track 81 (FIG. 25) controls the degree of lifting of a daisy wheel 27 as shown in FIG. 23 in the direction of arrows 83. If the wheel 27 is lifted only a slight amount, then the first print element 84 will be placed in position for printing. The maximum degree of lifting of daisy wheel 27 positions the fourth print element 84 for printing. The second and third print elements 84 are positioned for printing by lifting the daisy wheel 27 variously between the above extremes.

Thus, referring to FIG. 24 and assuming that printing assembly 26 has been moved to select an appropriate printing unit 27, downward movement applied to the outer end of an actuator lever 87 draws a link 88 downwardly to drive an operating arm 89 downwardly about a fixed pivot axis 91.

Downward movement of the outer end of operating arm 89, suitably coupled to a pick-up lever 92, serves to lift the selected daisy wheel 27.

Pick-up lever 92 includes a tooth 92a formed with a grooved edge or blade 92b (FIG. 26). Similarly, lifting arm 79 includes a tooth 79a formed with a tapered or bevelled edge adapted to be received in the grooved edge 92b of pick-up lever 92.

As shown in the region of arrow 86, four small rectangles represent a succession of four print elements 84 wherein a given one of the four print elements 84 will be in position to be struck by a print hammer 101 as noted below at FIGS. 22, 36.

Means for selecting the particular one of the four print elements 84 to be moved to the printing position includes (FIGS. 24, 25) lever arm 93 pivoted to frame 11 and driven by cam follower 82. The lower end of lever arm 93 drives a connecting rod 94 for positioning a displacement control block 96.

From inspection of FIG. 24, it will be evident that downward movement of actuator level 87 is limited by the presence of displacement control block 96 disposed beneath the bottom end of link 88. This downward displacement simultaneously limits the upward movement of pick-up lever 92.

Block 96 includes four steps: a, b, c, and d.

Thus, downward displacement of actuator lever 87 is directly controlled by the position of block 96 beneath the bottom end of link 88, and the position of block 96 is directly controlled by the rotation of cam track 81.

Finally, cam track 81 includes a number of cam follower positioning surfaces identified in sequence by the numbers: 1, 1, 2, 3, 4, 4, 3, 2, 1, 1, 2, etc., as shown in FIG. 25. As shown in FIG. 7, when viewfinder 38 of slide assembly 36 registers with a character in row No. 7, for example, the snail cam track 68 will then have positioned the second daisy wheel 27 into position to be lifted by blade 92a of pick-up lever 92. The degree to which the second daisy wheel 27 will be lifted in order to dispose a print element 84 corresponding to the character appearing in row No. 7 is indicated in the left-hand column as cam position No. 2. Thus, as shown in FIG. 25, the cam position No. 2 will move displacement control block 96 to dispose the "c" step 96c beneath link 88.

Means for cocking and releasing a print hammer assembly 97 responds to the movement of the upwardly extending control arm 98 (FIG. 24).

As shown in FIG. 36, print hammer assembly 97, arranged to move between retracted and advanced positions, includes an elongate rigid arm portion 99 carrying a print element striker 101 at its outer end. A rigid cocking member 102 characterized by a V-shaped trigger portion 102a moves about a pivot point 104. Means for spring loading print hamemr assembly 97 to move toward platen assembly 12 when released comprises the lever arm 106 forming a bell crank with respect to cocking member 102 and a spring 107 connected at one end to lever arm 106 and anchored at the other end to deck 108 which pivots about axis 109.

A leaf spring 111 interconnects rigid arm portion 99 with cocking member 102. By providing a fixed stop 112 in the path of a portion of cocking member 102, leaf spring 111 permits striker 101 to be thrown forwardly to strike a print element 84 and then to retract slightly out of the way.

Operation of print hammer assembly 97 can best be understood with respect to FIGS. 36-39 as now to be described. FIG. 36A shows an operator member 113 formed at its leading end with an upwardly and rearwardly extending wedge 114 for cooperating with a cam follower member 116 carried to depend beneath deck 108 (FIG. 39). Accordingly, as operator member 113 moves forwardly, cocking piece 103 engages the trigger portion 102a of cocking member 102 while wedge 114 progressively lifts deck 108 to ultimately release print hammer assembly 97 to be driven forwardly by the force of spring 107.

Trigger portion 102a includes a sufficiently broad retaining surface 102b in the direction of the length of operator 113 whereby upon release of actuator lever 87, the reset spring 90 connected between frame 11 and lever 87 lifts lever 87 to move print control arm 98 rearwardly thereby withdrawing operator 113 and wedge 114 from beneath deck 108. In addition, cocking piece 103 will move rearwardly as deck 108 lowers print hammer assembly 97 into position for re-engaging cocking piece 103.

Means for advancing a typewriter ribbon (not shown) between supply roll 120 and take up roll 122 in conjunction with each stroke of print hammer assembly 97 includes the ribbon advance cam 117 formed to extend to the side of operator 113 so as to engage a cam follower 118 carried on the end of a ribbon advance pawl 119.

As operator member 113 moves forwardly, cam follower 118 moves laterally to the position designated by cam follower 118' so as to move pawl 119 an equal amount. The other end of pawl 119 engages a ratchet 121 formed about the exterior of the base of the take-up roll 122 of typing ribbon. Means for guiding pawl 119 includes a guide pin 123 protruding upwardly through an elongate opening 125 formed through the shank of pawl 119. In addition, the shank of pawl 119 lies in a slot 130 formed in a guide block 124.

As shown in FIGS. 14-15C, means are provided for maintaining the transverse cable drive relatively taut notwithstanding the fact that printing assembly 26 moves between advanced and retracted positions in response to movement of slide assembly 36. Accordingly, a pair of stationary pulleys 126 fixed to frame 11 remain aligned with finger 76. A second pair of pulleys 127 disposed generally adjacent pulleys 126 are carried on the ends of a U-shaped frame 128 which moves between advanced and retracted positions together with the movement of printing assembly 26. Yet an additional pair of stationary pulleys 129 serve to hold a loop at each end of typewriter 10, one of the loops being arranged to cause the cable 77 to cross over itself.

Keyboard 22 includes 64 columns and 32 rows of ideographs or characters disposed in array 24 whereby 2048 characters appear.

Accordingly, there has been provided in the manner described above a keyboard assembly capable of operating a novel typewriter 10 having in excess of 2000 characters or ideographs, any one of which is individually selectable for printing.

Another embodiment of a keyboard assembly according to the invention includes means for generating a digital address and for retrieving a prerecorded storage character to be printed.

As noted in FIG. 45, an array 131 of characters carried on a keyboard of the kind described above can be scanned by a viewfinder 132 carried by a slide assembly 133 supported for lateral movement by a carriage 134. Slide assembly 133, carriage 134 and the array 131 of characters forming a keyboard are all as described above. As noted above, movement of slide assembly 133 along carriage 134 serves to rotate a splined shaft 136 as viewfinder 132 moves from one row to the next. Accordingly, the degree of rotation of shaft 136 can be employed to define the row of characters being scanned by viewfinder 132.

Means for generating an analog electrical signal indicative of the row being scanned by viewfinder 132 includes the worm 137 formed on one end of shaft 136 for driving a gear 138. Gear 138 coupled by means of a shaft 140 rotates the wiper of a potentiometer 139.

Accordingly, while shaft 136 may rotate a number of times as slide assembly 133 moves from the top row to the bottom row, provision of a worm drive as shown in FIG. 45 reduces the degree of rotation of the wiper of potentiometer 139 sufficiently to limit it to one revolution. Accordingly, the output from potentiometer 139 appearing on lead 141 provides an analog electrical signal representative of the row position within array 131.

Means for providing an analog electrical signal representative of the column position for a selected character within array 131 includes the positive displacement belt drive 142 connected to the upper end of carriage 134 in the manner described above. Accordingly, the cyclic drive belt 142 is trained about a pair of pulleys 143, 144 whereby as carriage 134 moves laterally across the keyboard, the teeth of the belt 142 will positively engage the teeth of pulleys 143, 144 so as to preclude slippage and loss of registration. Pullley 144 serves to drive a reduction gear 146 which in turn operates a gear 147 for rotation via shaft 145 the wiper of a potentiometer 148 thereby producing an analog output signal on lead 149 representative of the column position of a selected character. Each of leads 141, 149 includes an analog-to-digital converter 151, 152 for providing a digital signal on the output lead therefrom representative of the row and column positions of a selected character. Leads 153, 154 therefore supply appropriate digital inputs to a suitable microprocessor unit 156 capable of converting the digital inputs to an appropriate address signal on output lead 157. By pre-recording and storing each ideograph or character of array 131 in a computer storage and retrieval appratus 158, any given ideograph or character can be retrieved from computer storage 158 when properly addressed by the address appearing on input lead 157. In this manner the output of computer storage and retrieval apparatus 158 can, for example, control printing electronics or the like.

The keyboard assembly shown in FIG. 45 includes the detents 33a and registration openings 29a described above (FIG. 17) with regard to the first embodiment as well as other related apparatus since it is to be understood that FIG. 45 is a diagrammatic representation of the manner in which the keyboard assembly can generate digital signals representing the row and column positions of selected characters, converting these digital signals to an address, and controlling the readout of a pre-recorded data storage containing the same characters.

According to a further embodiment of the invention, a keyboard assembly 170 (FIG. 31) of the kind described employs means for transducing pre-recorded address information associated wth each selected character while electronically controlling printing, typing, or other recording of characters as selected. For example, as shown in FIG. 2, the undersurface of substrate 23 carries a layer 159 of a magnetic recording medium. The ends of drive belt 56 are anchored to a magnetic transducing assembly 161. Assembly 161 carries a magnetic head 162 cooperating with the medium 159.

As shown in FIGS. 30-33, the construction of a magnetic transducer assembly 161 and manner of operation includes means as now to be described.

Assembly 161 includes an elongate U-shaped shoe support 163 formed with a pair of confronting ribs 164 adapted to engage slots 166a (FIG. 30) in a pair of confronting guide rails 166. A drive belt 167 comparable to drive belt 56 described above and trained about a drive gear 168 and an idler gear 169 carries a connecting arm 171 interposed between belt 167 and transducer assembly 161 for moving transducer assembly 161 along the surface of medium 159 in response to movement of slide assembly 172 to register with a selected row of characters in the array 185.

Medium 159 includes a number of pre-recorded tracks 173 (FIG. 35) of information associated with a given ideograph or character carried on the upper surface of the keyboard. The squares 175 shown in invisible lines in FIG. 35 represent such characters on the opposite surface of the keyboard from the medium 159. By properly registering the viewfinder 180 with a selected character or ideograph, magnetic head 162 will be disposed substantially in position to play back information contained in an associated one of the prerecorded tracks 173.

Shoe support 163 carries an elongate, thin but semi-rigid drive strip 174 disposed to engage a rotatable drive capstan 176 driven by a constant speed motor 177. Motor 177 is energized in response to the closure of a pair of contacts 178, 179. Rotation of capstan 176 against strip 174 serves to draw the shoe support 163 and its associated transducer head 162 in the direction of arrow 181 (FIG. 33).

Contact 179 extends beyond the end of contact 178 and into the path of transducer head 162 whereby upon reaching contact 179 transducer head 162 will engage same and open contacts 178, 179 so as to deenergize motor 177.

In operation, when a character has been optically registered in viewfinder 180 and it is desired to transduce the information contained in an associated pre-recorded track 173, a thimble 182 can be moved relative to slide assembly 172 so as to draw transducer head 162 away from the region of contacts 178, 179. Contacts 178, 179 are spring loaded to a closed position whereby as soon as transducer head 162 releases contact 179, motor 177 becomes energized to operate capstan 176 in a driving direction. Thus, the ends of a flexible cable 183 attach to opposite ends of transducer head 162 so that movement of thimble 182 relative to slide assembly 172 serves to withdraw transducer head 162 in a direction to permit the drive capstan 176 to move the head 162 at a constant speed along its associated track 173, once thimble 182 is released.

As shown in FIG. 34, thimble 182 is carried on a separate section 172a of slide assembly 172. The section 172a includes a tongue-and-groove sliding fit and a roller support 184 riding on the upper surface of carriage 186 comparable to carriage 29 previously described.

Thus a keyboard assembly 170 as shown in FIGS. 30-35 has been provided wherein pre-recorded information associated with a given character can be transduced directly therefrom.

For example, according to one embodiment it has been observed to be desirable to reinforce the pronounciation of a given ideograph where people of different dialects in the same language are operating the keyboard assembly 170. As shown in FIG. 43, keyboard assembly 170 provides an audio output via lead 187. Lead 187 when coupled, for example, via switch 188 connected to the upper contact point 188a supplies the transduced information from an audio track 173 (FIG. 35) to an amplifier 189 whereby the output from amplifier 189 feeds into an audio output device, such as a headset 191.

According to another embodiment, by recording a given computer address on the magnetic medium 159 and transferring switch 188 (FIG. 43) to supply the output from the transducer assembly to an amplifier 192, the amplified address signal can be supplied via lead 193 to a microprocessor 194 for controlling the output of a 2,000 character read only memory 196.

Memory 196 includes pre-recorded character representative of each of the printed characters on the keyboard assembly 170, and upon receiving the appropriate address control signals from microprocessor 194, memory 196 supplies data to printing electronics 197 for controlling the printing of the characters selected. In addition, for purposes of verification, a liquid crystal display 198 serially receives characters to be printed.

Finally, in addition to controlling the operations of printing characters selected from the keyboard array, a system as shown in FIG. 43, can also control additional operations usually associated with a keyboard and identified by other characters of the array. For example, the function of a space bar or shift key can readily be identified on the keyboard by an associated character, or groups of characters forming a word or symbol. As represented in FIG. 35, each such character is associated with pre-recorded information on the back of the substrate 23 to be transduced and entered into ROM 196 via microprocessor 194 for controlling the various operations associated with the printing electronics.

As thus arranged, a system is provided wherein a pre-recorded address associated with an optically selected character controls a computer storage containing the characters so as to be able to control the printing of these characters.

In addition to the above, by providing interchangeable printing units such as the daisy wheels 27, the font of characters or ideographs can be readily replaced as shown in FIG. 40 to correspond to the new font provided by the new printing units 27. Thus, means for readily releasably retaining the keyboard to the typewriter has been provided whereby substrate 23 becomes removable from typewriter 10 and replaceable by a different array of characters or ideographs as shown in FIG. 40.

By moving carriage assembly 199 beyond the right hand end of the array of characters, and opening a latch 201 which otherwise serves to register keyboard 202 with respect to the upper frame members 203, keyboard 202 can slide upwardly along guideways 204 formed on opposite sides of the keyboard 202 and be removable from the machine.

One particular keyboard of a type adapted to be substituted into the keyboard assemblies described herein has been shown in FIG. 42 wherein in the region designated 206 the most used 1024 ideographs can be located as a matter of convenience. Accordingly, the detent registration openings 207 are disposed 0.20" apart on centers. In the upper right hand region designated 208 registration openings for detenting are more closely spaced and disposed on 0.10" apart on centers. Region 208 can contain something on the order of 2048 commercial and professioal characters.

Similarly, 2048 characters can be located in region 209 for other special applications.

When keyboard 211 is substituted, the registration openings 212 along carriage 134 (FIG. 45), for example, will necessarily need to be more closely spaced due to the closer spacing of the rows of characters. However, as a matter of practice, it is preferred to disposal openings 212 at such closer spacing so long as their presence will not interfere will proper registration with respect to the row spacing of the other character fonts.

From the foregoing it will be readily evident that there has been provided an improved keyboard assembly of a type adapted for use in a number of different applications but which can be relatively simply used in providing a typewriter requiring a font using a great number of ideographs as employed in the oriental languages, and others.

From the foregoing, it will be readily evident that the keyboard permits a relatively easy selection of a great number of characters simply by "socketing" the operator's fingertips into thimbles 42, 43, 44 and moving the optical viewfinder 38 into registration with a given character, all with a minimum of effort while using only one hand. Thus, movement of viewfinder 38 into registration with a given character serves to dispose a print element carrying a corresponding character into position whereby it can be printed.

What is claimed is:

1. In a keyboard assembly for controlling the selection of characters associated therewith comprising a first layer of material carrying an array of characters arranged thereon, a second layer of magnetic material forming an information storage surface of a type for cooperating with a magnetic head for transducing information with respect thereto, said storage surface serving to carry recorded information thereon associated with each of said characters and means supporting said first and second layers to dispose each of the characters of said array in predetermined relation to its associated recorded information of said second layer, said recorded information on said storage surface associated with said said character of said array being disposed on said storage surface in a manner to be transduced in predetermined relation to associated characters related thereto appearing in said array, and means for selecting characters from said array, a magnetic head movably cooperating with respect to said information storage surface to transduce information therebetween relative to a selected character, said means for selecting characters serving to dispose said magnetic head on said magnetic surface in position to be moved relative thereto for transducing information between said storage surface and said head with respect to a selected character in position to be moved along and to transduce said information between said head and said storage surface.

2. In a keyboard assembly for selecting characters to be recorded, the assembly including an array of characters arranged on a semi-rigid substrate, a plurality of print element rotatable into position to be printed, character selection means carried by said keyboard and rollably coupled thereto to be movable to travel in spaced relation across and above said array to the locus of each of said characters, means serving to hold said character selection means at each selected locus to restrain said character selection means against movement across said keyboard during printing of a selected character, means for printing each said character while said character selection means remains restrained, and means responsive to said movement of said selection means across said array to the locus of a given character in said array for disposing a print element associated with said given character in position for printing.

3. A keyboard assembly for use in a typewriter of a type employing interchangeable printing units, a keyboard comprising substrate means having a front and back surface, said front surface carrying an array of characters thereon, analog means rollably coupled to be guided by said substrate means across said array for selecting characters from said array to be printed, pairs of detents for holding said analog means at an associated locus for a given character, the detents of each said pair being carried respectively by said analog means and by said substrate means, the number of said pairs corresponding to an associated number of characters to be printed, and means for readily releasably retaining said substrate means on the typewriter, said substrate means thereby being removable from the typewriter and replaceable by replacement substrate means carrying a different array of characters and a different number of said detents whereby changing the printing units of the typewriter can correspond to the keyboard provided by the replacement substrate means.

4. In a keyboard assembly for use with a plurality of print elements rotatable conjointly as a unit into position to be printed, said assembly including a substrate characterized by an array of characters carried thereon, a character selecting device rollably coupled to said substrate to be movable to travel in spaced relation across and above said array of characters carried on a face of said substrate to dispose said character selecting device selectively into registration with said characters, and means for rotating said print elements to the degree and in response to movement of said selecting device across the face of said substrate.

5. In a keyboard assembly for selecting characters to be recorded, the assembly including a semi-rigid sheet of material carrying on one face thereof an array of characters to be printed, a magnetic recording surface carried on the reverse face of said semi-rigid sheet, character selection means carrying a viewing portion movable therewith into optical registration with a selected character shown in said array to be recorded, and means operable in response to movement of said viewing portion of said selection means into proper optical registration with respect to a given character of said array for controlling and optically verifying recordation of said given character, said means for controlling recordation including means operated by movement of said selection means for positioning one of a plurality of print elements for printing.

6. In a keyboard assembly according to claim 5 comprising a magnetic head carried by said character selection means disposed to move along and transduce signals relative to said magnetic recording surface, a plurality of adjacent thimbles forming upwardly open sockets said plurality of adjacent thimbles being disposed to be operable conjointly by the fingers of one hand of an operator and carried by said character selection means, said sockets serving to receive fingertips of an operator's hand socketed therein for moving said selection means to register said viewing portion with a given character in order to control the selection of a character to be printed while visually verifying said selection, one of said thimbles being operable relative to the other said thimbles for opeating said magnetic head to move relative to said magnetic recording surface, and means for audibly pronouncing said selected character in response to operation of said one of said thimbles.

7. In a keyboard assembly according to claim 6 in which said means for audibly pronouncing said selected character comprises said magnetic head for transducing information signals relative to said magnetic recording surface, means coupled between said one thimble and said head for moving said head to a position for initiating transducing of information signals relative to said magnetic recording surface associated with a selected character of said array, and means for moving said head relative to said magnetic recording surface at substantially constant speed relative to said magnetic recording surface to transduce said information signals.

8. In a keyboard assembly according to claim 7 comprising an optical viewfinder carried by said means for selecting characters from said array, said viewfinder being disposed to be registered with respect to said characters of said array to provide an optical verification of each selected character to be recorded, said magnetic head providing an audio verification of said selected character.

9. A daisy wheel printing unit for use in apparatus controlled by a keyboard assembly, said assembly including a substrate, an array of characters disposed on one face of said substrate, and character selection means coupled to rollably move across said substrate to the locus of a selected character, said printing unit comprising a hub and a number of petals disposed on associated radii thereof, first and second print elements carried by each petal in spaced relation therealong, alternate petals differing in length to a predetermined degree whereby said print elements travel in a plurality of at least four concentric spaced circular paths in response to rotation of said printing unit, said print elements being disposed in a predetermined sequence associated with succeessive rows of characters on a keyboard, said print elements of said sequence being disposed on successive adjacent petals and in successive radially adjacent paths, means forming an elongate gear-like body disposed transversely of the plane of said printing units, the radially outer edge of each said printing unit being formed with a gear-like periphery for engaging said body and serving to mesh with and roll around said elongate gear-like body in response to lifting a given one of said printing units, thereby serving to present said print elements in said predetermined sequence for printing, and means for rotating said body in response to movement of said character selection means for conjointly rotating all said printing units together to radially dispose a printing unit in position to be lifted to move around said body to thereby dispose a print element thereof in position to be printed.

10. In a keyboard assembly for controlling operations associated therewith, each operation being identified by a given one of many characters disposed in an array, the assembly including a substrate carrying said array of characters thereon, character selection means rollably coupled to and guided by edge margins of said substrate to rollingly travel across and above the array and having a viewing portion movable therewith into optical registration with each selected character of said array, and means operable in response to movement into proper optical registration of said viewing portion with respect to a selected character for controlling an operation associated with said selected character.

* * * * *